(12) United States Patent
Doke et al.

(10) Patent No.: US 12,033,434 B1
(45) Date of Patent: Jul. 9, 2024

(54) INVENTORY STATUS DETERMINATION WITH FLEET MANAGEMENT

(71) Applicant: Amazon Technologies, Inc., Seattle, WA (US)

(72) Inventors: Abhay Doke, Boston, MA (US); Venkataraman Santhanam, Marlborough, MA (US); Tomer Anor, Sudbury, MA (US); Kamal Ramachandran Kuzhinjedathu, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 101 days.

(21) Appl. No.: 17/948,035

(22) Filed: Sep. 19, 2022

(51) Int. Cl.
| | | |
|---|---|---|
| *G06V 40/20* | (2022.01) | |
| *G06Q 10/087* | (2023.01) | |
| *G06Q 30/0201* | (2023.01) | |
| *G06V 10/26* | (2022.01) | |
| *G06V 20/56* | (2022.01) | |
| *G08B 13/196* | (2006.01) | |
| *G08B 13/24* | (2006.01) | |
| *H04N 23/61* | (2023.01) | |

(52) U.S. Cl.
CPC ........... *G06V 40/20* (2022.01); *G06Q 10/087* (2013.01); *G06Q 30/0201* (2013.01); *G06V 10/26* (2022.01); *G06V 20/56* (2022.01); *G08B 13/196* (2013.01); *G08B 13/19645* (2013.01); *G08B 13/2402* (2013.01); *G08B 13/2462* (2013.01); *H04N 23/61* (2023.01)

(58) Field of Classification Search
None
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 * | 10/2016 | Kobres | ................... G06Q 30/00 |
| 10,127,438 B1 * | 11/2018 | Fisher | ..................... G06V 10/82 |
| 10,133,933 B1 * | 11/2018 | Fisher | ..................... G06V 20/41 |
| 10,789,569 B1 * | 9/2020 | Anor | ...................... G06F 18/211 |
| 11,845,191 B1 * | 12/2023 | Kuzhinjedathu | ...... B25J 9/1679 |
| 2013/0284806 A1 | 10/2013 | Margalit | |
| 2015/0029339 A1 * | 1/2015 | Kobres | ................... H04N 7/181 |
| | | | 348/150 |
| 2020/0005229 A1 * | 1/2020 | Durkee | ................. B64C 39/024 |
| 2022/0019961 A1 * | 1/2022 | Johnson | ............... G06Q 10/087 |

(Continued)

*Primary Examiner* — Ricky Chin
(74) *Attorney, Agent, or Firm* — Lee & Hayes, P.C.

(57) ABSTRACT

This disclosure describes, in part, techniques for identifying facility status updates using opportunistic data gathering from independently controlled devices operated by users within the facility. For instance, system(s) may determine first status information for inventory and/or locations within the facility and determine associated freshness scores. In response to a freshness score being below a threshold level, the system may determine imaging locations for the independently controlled devices to be positioned at to capture image data to update information on the inventory or locations. The system may receive uploaded image data from a fleet device after it opportunistically reaches the imaging location and captures image data. The system may then update the facility status information and the freshness score for the particular location.

20 Claims, 11 Drawing Sheets

(56) References Cited

U.S. PATENT DOCUMENTS

| | | | |
|---|---|---|---|
| 2022/0318725 A1* | 10/2022 | Hohmann | G06Q 10/087 |
| 2023/0156158 A1* | 5/2023 | Moyne | G06V 20/52 |
| | | | 348/159 |
| 2023/0232108 A1* | 7/2023 | Hagen | H04N 23/69 |
| | | | 348/143 |
| 2023/0245058 A1* | 8/2023 | Hagen | G06V 10/764 |
| | | | 705/28 |
| 2023/0260378 A1* | 8/2023 | Goossens | G05D 1/0287 |
| | | | 340/326 |
| 2023/0410029 A1* | 12/2023 | Prasad | G06Q 10/0838 |

* cited by examiner

| Metrics 602 | | |
|---|---|---|
| Inventory Location Identifier 604 | Status 606 | Timestamp 608 |
| Identifier 1 | First Status | First Timestamp |
| Identifier 2 | Second Status | Second Timestamp |
| Identifier 3 | Third Status | Third Timestamp |
| Identifier 4 | Fourth Status | Fourth Timestamp |
| Identifier 5 | Fifth Status | Fifth Timestamp |

FIG. 6

INVENTORY STATUS DETERMINATION WITH FLEET MANAGEMENT

BACKGROUND

Traditional physical stores maintain an inventory of items in customer-accessible areas such that customers can pick items from the inventory and take them to a cashier for purchase, rental, and so forth. For example, a customer may take an item, such as a shirt, from a rack located within the store. The customer may then take the shirt to a cashier that is located near an entrance of the store. Using a point-of-sale device, the cashier may process a transaction for a price of the shirt. For example, the cashier may input payment information, such as a card number, into the point-of-sale device, which may charge the card of the customer for the price of the shirt.

When users are online shopping, system(s) are able to identify items that the users are browsing even when the users do not purchase the items and/or add the items to a digital shopping cart. For instance, the system(s) may identify the items based on the users selecting the items for review, placing cursors and/or other input devices over the items, and/or using one or more additional techniques. The system(s) may then perform one or more actions based on these browsing events, such as later providing the users with advertisements for the items. As such, it may be beneficial to also determine items that users are browsing at physical stores even when the users do not purchase the items and/or interact with the items, such removing the items from inventory locations.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example of metrics for inventory locations with associated statuses, according to at least some examples.

DETAILED DESCRIPTION

Figure 1:
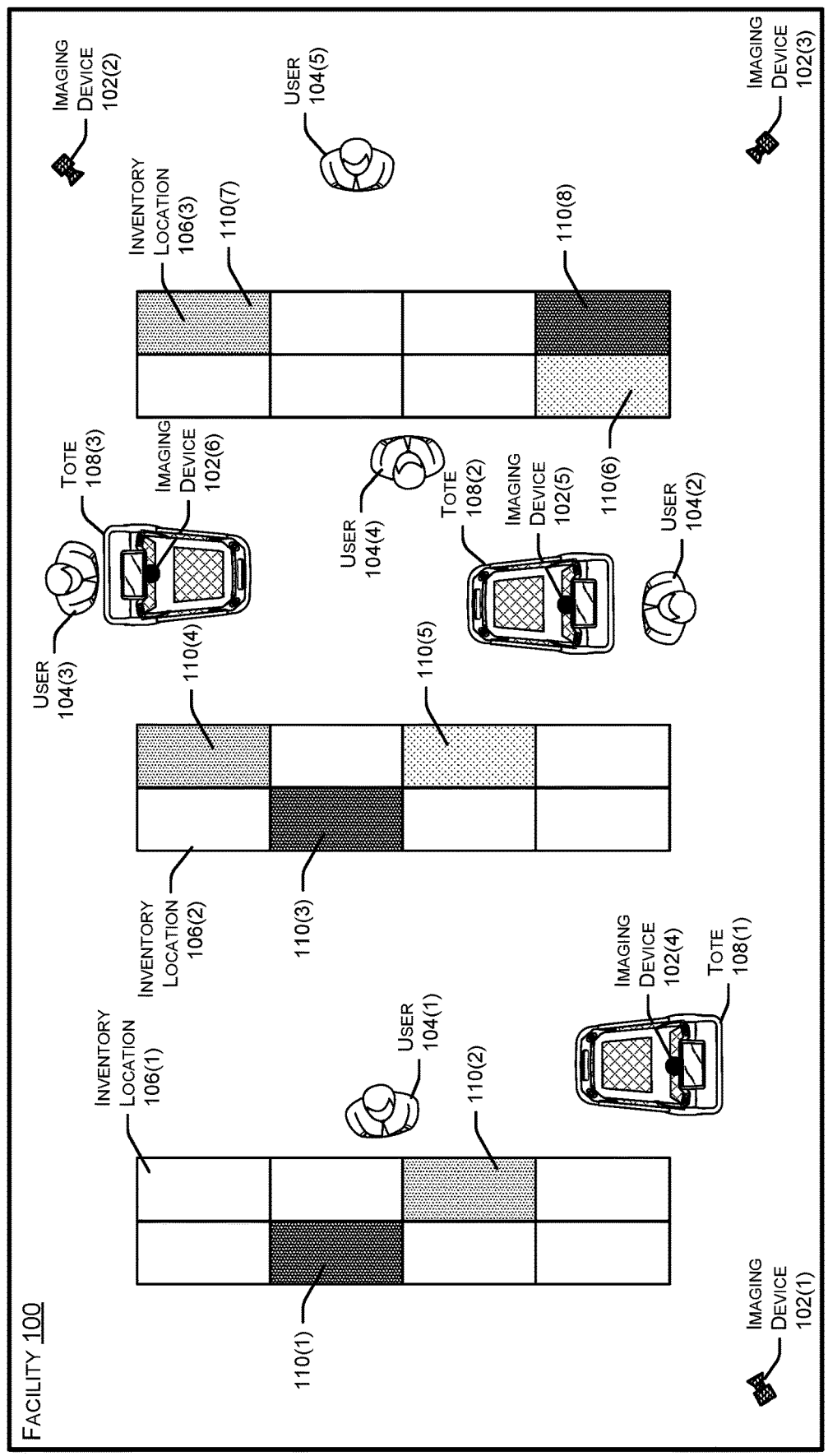
FIG. 1 illustrates an example facility with inventory locations and independently controlled devices that may be orchestrated to identify facility and inventory status information, according to at least some examples.

This disclosure describes, in part, techniques for update status information regarding a facility through use of independently controlled devices equipped with sensors. For instance, systems may include servers to provide criteria and instructions to a fleet of independently controlled devices for capturing status information opportunistically as the independently controlled devices are navigated through the facility. The independently controlled devices may include one or more cameras, in some examples, and may be pushed or navigated by users within the facility. In this manner, the devices are independently navigated around the facility such that the system is not able to directly cause the devices to navigate to particular locations to gather information regarding the status of the facility. Furthermore, due to limitations in bandwidth and processing capacity that may exist on the independently controlled devices and/or a network communicating between the system and the devices, the system may aim to reduce redundant or continuous streams of image data and instead only request status update information from the fleet of devices at particular time intervals. In this manner, the fleet of devices may be instructed to opportunistically gather status information, such as image or other sensor data within particular regions of the facility as they happen to be navigated to those locations by users, and the devices may upload such data to the system for processing at particular opportunistic intervals to reduce bandwidth consumption by the devices.

In an example, the independently controlled devices may include a fleet of carts or totes associated with a shopping environment. The carts or totes are equipped with one or more imaging devices (e.g., cameras) to capture image data for one or more purposes. In some examples, the carts may be used as part of an automated checkout system as described herein.

Turning to a particular example, the user may enter the facility through an entry location, navigate through the facility looking for items, pick up an item (e.g., a food product) from an inventory location within the facility, and exit the facility through an exit location. While in the facility, and at the knowledge and request/consent of the user, the system may use sensors (referred to, in these examples, as "first sensors") to determine locations of the user while traveling through the facility. For example, the system may use cameras, floor weight sensors, and/or the like to generate sensor data (referred to, in these examples, as "first sensor data"). The system may then analyze this first sensor data (e.g., image data) to locate the user as (and/or after) the user navigates through the facility. The system may then store, in association with the account of the user, timestamp data representing at least times that the user was located at various locations within the facility.

In such automated checkout systems, the system may use one or more sensors (including, for example the sensors on the cart in addition to other sensors within a facility) when determining whether the user was in possession of the item. For example, when the user initially removes the item from the inventory location, a sensor, such as a weight sensor, may send sensor data to the system. The system may analyze this sensor data to determine that the item was removed from the inventory location at a given time. The system may also analyze the first sensor data to determine that the user was located proximate to the inventory location at the given time. As such, the system may determine that it was the user that removed the item from the inventory location. The system may use this determination when determining the probability that the user was in possession of the item when exiting the facility.

The carts equipped with cameras may provide additional image data that may be used by the system to determine items selected by a user throughout the facility by identifying the items either as they are selected or as they are placed in the cart. As such, the cart is capable of gathering high-resolution image data of items and the environment that may be used for updating a status of the facility (sometimes referred to as an organizational status), such as the inventory status of particular items, cleanliness, tidiness, planogram compliance, organization, or other states of the facility, as well as to gather further information for additional purposes including gaze information of users while interacting with items to provide data regarding how users interact with items within the facility, as such information may be used for various marketing and other strategic purposes.

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or the entry location may include a microphone, camera, or other sensor that generates sensor data at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or the AC exit location may include a microphone, camera, or other sensor that generates sensor data at the request of the user for use in identifying the account of the exiting user.

While a user is navigating through the facility, the cart, or other such device, may capture image data that can be used by the system to provide information about the facility in addition to the item information described above with respect to user interactions. For example, the system may identify inventory locations that need restocking or cleaning or may identify items selling at particularly high or low rates and thereby provide metrics on user interactions within the facility.

The carts have one or more cameras that are tuned and setup for scanning products in and around the space of the cart and at a depth of field that may, in some examples, not extend more than a foot or two past the edge of the cart. For capturing clear images of the inventory locations, the settings associated therewith need to be adjusted such that the depth of field enables capture of clear image data at greater distances.

During their time within the facility, the user may direct the cart through any number of different non-standard routes that may wind through the facility and may or may not pass-through certain locations. As such, the system cannot rely on a single cart or device to pass through a particular location at a particular time for providing such facility stat information. Accordingly, the system communicates, in the example, to a fleet of carts information related to inventory locations where information is needed. Then, as the carts are pushed through the facility, when they encounter one of the indicated regions the cart may gather, opportunistically, the requested information, and proceed according to a typical shopping experience without interrupting the actions or activity of the user.

In some examples, the system may communicate particular inventory locations to the fleet of carts based on a heat map or update information related to a freshness or timestamp associated with a last update for each inventory location within the facility. The heat map may be used to identify regions where additional updated information is needed to maintain a desired level of freshness with respect to the status information. In some examples, the heat map may be used to identify particular inventory locations where a last update or timestamp associated with a last update is greater than a threshold period of time away from a current time. The threshold may be varied based on the type of facility, for example with a grocery store having a first time threshold shorter than a second time threshold associated with a sporting goods store. In some examples the time threshold may vary based on a type of product, for instance with a first time threshold for fresh produce and a second time threshold for canned goods or large items. In this manner, item may be updated as needed throughout the facility in a customizable manner.

In some examples, the system may communicate inventory locations as well as additional information to the fleet of carts that may be used for gathering image data in the requested locations. The additional information may include trigger criteria as well as imaging sensor settings for capturing image data of the inventory location. The trigger criteria may establish one or more additional conditions and/or constraints that may need to be fulfilled before image data is captured by the cart. For example, the trigger criteria may include a distance from the inventory location being within a particular range, the cart being still or moving at a rate below a threshold rate, the view of the inventory location unobstructed by users or other objects, and other such criteria. In some examples, an imaging regions may be defined by the system, with the imaging regions describing a region within which the cart may capture image data of the inventory location. In some examples, the inventory location may be a high or low shelf that requires the cart to be at least a minimum threshold distance from the inventory location so that the shelf is visible. In some examples the minimum threshold distance may be smaller for shelved at a height at or around the height of the imaging device of the cart. Additional sensors such as an inertial motion unit, proximity sensor, distance sensor, and other such sensors may be used to determine whether the trigger criteria are fulfilled before capturing the image data of the inventory location when within an imaging region. Additionally, the imaging sensor settings may include settings to describe aperture and/or focal length or other settings of the imaging sensor for gathering information about the inventory location.

Due to limitations on bandwidth and processing capacity, it may be advantageous to receive a minimal or reduced number of high-resolution images from the devices that will provide maximum coverage to update the status of items or state of the facility. In some examples, the state of the facility may include the state of inventory (e.g., out of stock, number of items in stock, number of items at an inventory location etc.), cleanliness (e.g., does a particular location need to be cleaned from a spill or straightened up or organized), planogram compliance (e.g., are items placed where they are meant to be), tidiness (e.g., are there items in places they shouldn't be), and other such states. Accordingly, the freshness counter and/or timestamp data may be used to only request inventory location status data when the timestamp reaches a threshold time period away from a current time and/or a freshness score expires for a particular location. The freshness score may be determined by an algorithm based on the type of location, type of items at the location, type of facility, expected rate of removal and/or sale of items from the particular location, actual rate of events or activity detected at the inventory location, and other such factors. The heatmap described above may be generated according to such a freshness score that accommodates these factors in addition to timestamps for determining when additional image data and/or status information should be updated.

Due to the bandwidth limitations within the facility, the carts may be configured to upload image data at particular time periods and/or locations. For example, during use within the facility the cart may be communicating with the system to update a virtual cart of a user and identify items placed within the cart. Accordingly, image data captured by the cart may not be communicated until the cart is no longer using communication bandwidth for the aforementioned communications. Instead, data from the carts may be uploaded when a cart enters a corral or other standby location, is inactive for a threshold period of time, or otherwise is not actively communicating with the system and thereby has bandwidth availability for communicating the high-resolution data. In some examples the carts may communicate at regular intervals, such as predetermined limited time windows throughout a session within the facility. In some examples, the carts may communicate over different channels or networks to convey the image information to the system, thereby reducing or eliminating any potential impact on the services used by a user during the automated checkout session.

In some examples, the upload of image data from the carts may be performed based on a freshness score (e.g., after a period of time and/or based on other factors), based on a velocity of throughput (e.g., an actual, determined, and/or estimated measure of items being removed from inventory locations), image quality assessments, and battery status of the carts. For example, the freshness score may be used to determine a particular cart, of a number of available carts, to upload image data from while restricting or limiting image data uploads from other carts. In some examples, the velocity of throughput may be used to determine a freshness for inventory data and may inform a frequency of updates of item inventory. In some examples, image data from multiple carts may be uploaded for particular intervals, such as to determine item interactions at different times of dat. In some examples, image assessment may be performed by the carts to compare one or more possible image uploads from one or more carts. The image assessment may be based on an image score from a machine learning algorithm, a clarity, sharpness, lighting, pixels per inch, and other such measurements.

An image to upload from multiple images among one or more carts may then be determined based on the image assessment. In some examples the battery or power status of the carts may be used to determine the upload of image data. For example, with two carts in a corral in standby mode, each having image data to upload of a single location, the system may select one of the two carts to upload based on the cart having a battery status indicating it has more on-board power than the second cart.

In some examples, the system may dynamically determine to upload image data from one or more carts based on available resources. Available resources may include network bandwidth, battery or power resources, memory, and other such resources. For instance, a single cart may be selected to upload image data in response to having limited network bandwidth, while two or more carts may upload in instances where network bandwidth is not limited in the same manner.

In the example, the system receives, as an input, an image of an inventory location and determined bounding boxes around products and product spaces that are out of stock. As part of this determination, image registration may be performed to ensure a consistent perpendicular view of the inventory location before performing the bounding box location. The bounding boxes may be determined based on identities of items expected to be in the inventory location, for example based on planogram data and/or surrounding item data. The system may then generate an alert if a restock action is needed, a reorganization, a cleaning, or other such action is warranted based on the updated image information at the inventory location.

The image registration may be used to determine exact inventory locations that need attention or are out of stock. In some examples, the image registration may be used for identifying updates or changes to inventory or status information stored by the system. Frontal images of the inventory locations are captured for the inventory locations and images from the carts may be matched and compared against such frontal images to determine portions of the inventory locations visible in the image data. Accordingly, when inventory locations are identified as out of particular inventory items, the items are identified for addressing by an associate after the system notifies an associate of the status update.

In some examples, the system may further communicate with the carts during the user interactions to encourage or nudge a user to travel to particular locations using a gamification interface. For instance, a top-view of the facility may be displayed on a display of the cart with markers in particular locations indicating virtual tokens or items that a user may collect by traveling to the locations indicated by the markers within the store. In this manner, the user may be incentivized to travel to the imaging regions identified by the system without the system providing actual control signals to the cart. In some examples, the tokens may be associated with particular rewards such as discounts or other benefits that the user may receive as a result of traveling to the location indicated by the marker so the cart can capture the image data needed as indicated by the heat map. Such gamification may encourage particular behavior by a user for the benefit of the facility as well as a gaming satisfaction or tangible benefit (e.g., discount) provided by the facility as an incentive.

The systems and techniques described herein provide numerous benefits and improvements over existing technologies. In particular, the systems described herein provide for monitoring and updating status information of a facility to aid in providing a consistent experience for users who wish to acquire items at the facility and expect them to be in particular inventory locations. Additionally, the systems described herein provide for updating the status or information within a facility without requiring any additional components or systems and instead relying on opportunistic data gathering by existing systems, thereby reducing complexity within the system. Furthermore, the systems provide for improvements over other systems by enabling preservation of network bandwidth for automated checkout processes while also enabling facility status updates using a single unified system and network architecture.

FIG. 1 illustrates an example facility with inventory locations and independently controlled devices that may be orchestrated to identify facility and inventory status information, according to at least some examples. The facility 100 includes imaging devices 102(1)-(6) (also referred to as "imaging devices 102") generating image data representing the facility 100, inventory locations 106(1)-(3) (also referred to as "inventory locations 106"), and users 104(1)-(4) (also referred to as "users 104"). The imaging devices 102 may be positioned at locations within the facility as well as located on a tote 108 (e.g., such as on totes 108(1)-(3)). The imaging devices 102(1)-(3) are stationary while imaging devices 102(4)-(6) are mobile due to being located on totes 108 that are independently controlled by users 104.

As shown, the imaging devices 102 may be located at various locations within the facility 100, where some of the imaging devices 102 are stationary while other imaging devices 102 are mobile. For example, the imaging devices 102(1)-(3) may be attached to portions of the facility 100 such that the imaging devices 102(1)-(3) remain stationary. As such, the system(s) may store data representing the locations of the imaging devices 102(1)-(3). Additionally, the imaging devices 102(4)-(6) may respectively be attached to totes 108(1)-(3) (also referred to as "totes 108"), such as shopping carts. As such, the locations of the imaging devices 102(4)-(6) may change as the users 104 are utilizing the totes 108 within the facility 100. Because of this, the system(s) may receive data representing the locations of the totes 108 and may then use image data captured from the totes 108 to update a status of the inventory locations 106 as described herein.

In some examples, one or more of the imaging devices 102 may include an omnidirectional camera with one or more of wide-angle lens(es) and/or fisheye lens(es). For example, a first lens may be directed in a first direction creating a first field-of-view (FOV) that is at least 180 degrees and a second lens may be directed in a second direction creating a second FOV that is at least 180 degrees, where the first direction is opposite to the second direction. While this example only describes using two lenses that each create a FOV of at least 180 degrees, in other examples, the imaging device 102 may include any number of lenses that together create the omnidirectional camera. As such, the imaging device 102 may be configured to generate image data representing a view that surrounds an entirety of the imaging device 102. For example, if the imaging device 102 is located on a tote 108, then the imaging device 102 is able to generate image data representing an entirety of the area surrounding the tote 108.

In some examples, the system(s) may respectively associate the totes 108(1)-(3) with the users 104(1)-(3) and use the associations to identify the users 104(1)-(3) when represented by image data. For example, and for the user 104(1), an electronic device attached to the tote 108(1) may receive information associated with the account of the user 104(1). The information may include, but is not limited to, an identifier, a password, payment information, a code (e.g., a Quick Response (QR) code, etc.), and/or any other type of information that the system(s) may use to identify the account. In some examples, the electronic device receives the information from a user device in possession of the user 104(1). Additionally, or alternatively, in some examples, the user 104(1) inputs the information into the electronic device. In either of the examples, the electronic device may then send the account identification data representing the information to the system(s). Using the account identification data, the system(s) may identify the account of the user 104(1) and associate the account with the tote 108(1).

Based on this association, the system(s) may then determine that image data generated by the imaging device 102(4) likely represents the user 104(1). In some examples, the system(s) still perform one or more imaging processing techniques in order to confirm that the image data represents the user 104(1). For example, the imaging device 102(4) may generate initial image data representing the user 104(1) using the tote 108(1), such as pushing the tote 108(1) through the facility 100. The system(s) may then use that initial image data to later determine that additional image data also represents the user 104(1). For example, when receiving additional image data, the system(s) may compare the initial image data to the additional image data and based on the comparison, determine that both the initial image data and the additional image data represent the same user. As such, the system(s) may determine that the additional image data also represents the user 104(1).

While the users 104 are within the facility 100, they may traverse the facility in any direction and at any location, with the totes 108 free to move wherever directed by the users 104. The system(s) may maintain a heatmap or status of the inventory locations 106(1)-(3) (also referred to as (inventory locations 106") to keep an up-to-date log of the status of items at the inventory locations 106. For example, the system may determine a freshness score associated with the inventory locations 106, and more specifically with sections of the inventory locations 106 such as individual shelves and sections of shelves, including locations 110(1)-(8) (also referred to as "locations 110"). The locations 110 may include shelves or sections of displays, or other such locations where items may be stored. The freshness score associated with the locations 110 may indicate a period of time since status information was determined for the locations 110.

In some examples, the freshness score or timestamp associated with a last update for each location 110 within the facility 100 may be displayed or stored in association with a heat map. The heat map may be used to identify regions where additional updated information is needed to maintain a desired level of freshness with respect to the status information. For instance, in FIG. 1, locations 110(1), 110(3), and 110(8) are illustrated with a first level of shading that may indicate a first freshness score that is at or near a threshold while locations 110(2), 110(4), 110(5), 110(6), and 110(7) are shown with varying shades indicating freshness scores that may be further from the threshold and therefore not as near a time for updating as locations 110(1), 110(3), and 110(8). The freshness score may approach a threshold before additional information is requested from the totes 108 by the system. In some examples, the heat map may be used to identify particular inventory locations where a last update or timestamp associated with a last update is greater than a threshold period of time away from a current time. The threshold may be varied based on the type of facility, for example with a grocery store having a first time threshold shorter than a second time threshold associated with a sporting goods store. In some examples the time threshold may vary based on a type of product, for instance with a first time threshold for fresh produce and a second time threshold for canned goods or large items. In this manner, item may be updated as needed throughout the facility in a customizable manner.

The freshness score and/or timestamp data may be used to only request inventory location status data when the timestamp reaches a threshold time period away from a current time and/or a freshness score expires for a particular location. The freshness score may be determined by an algorithm based on the type of location, type of items at the location, type of facility, expected rate of removal and/or sale of items from the particular location, actual rate of events or activity detected at the inventory location, and other such factors. The heatmap described above may be generated according to such a freshness score that accommodates these factors in addition to timestamps for determining when additional image data and/or status information should be updated.

Figure 2:
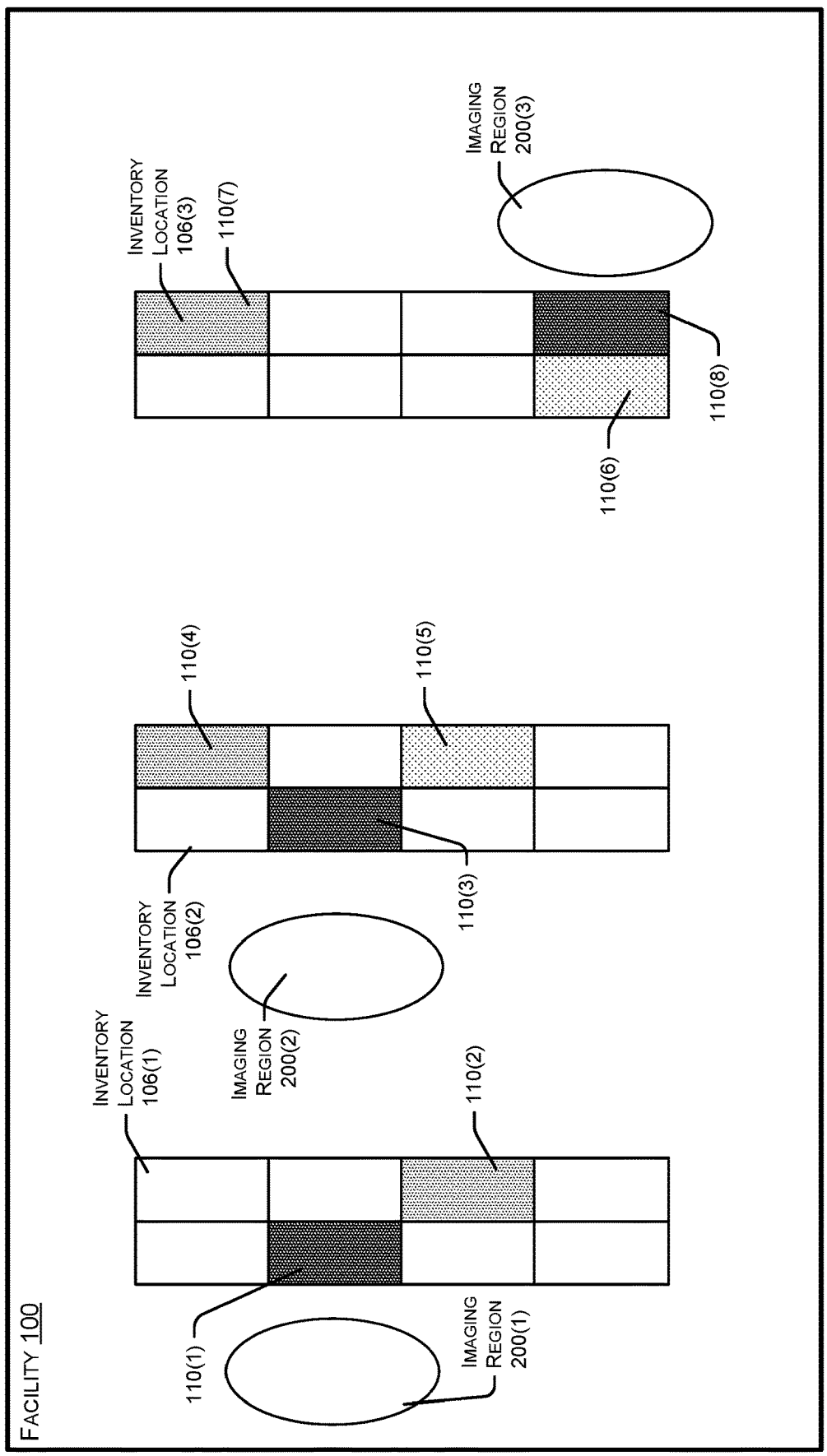
FIG. 2 illustrates an example representation of the facility with imaging regions identified for image capture of inventory locations by independently controlled devices, according to at least some examples.

FIG. 2 illustrates an example representation of the facility with imaging regions identified for image capture of inventory locations by independently controlled devices, according to at least some examples. The facility 100 is shown in a representative manner with the inventory locations 106 illustrated having the heat map as discussed herein with respect to a freshness score. Accordingly, the system may determine that, due to the freshness score for locations 110(1), 110(3), and 110(8) exceeding a threshold value (or being below a threshold level of freshness in some examples), updated data may be requested from the totes 108. Accordingly, the system determines imaging regions 200(1)-(3) (also referred to as "imaging regions 200") where the totes 108 may be positioned to capture image data of the desired locations.

The imaging regions are positioned at distances from the locations 110(1), 110(3), and 110(8) that may vary based on a height of the specific location targeted. For example, location 110(3) may include an update for an upper shelf that may only be visible to the tote 108 at greater than a first threshold distance. On the other hand, location 110(8) may include a location at a shelf at or near the height of the tote 108 such that a second threshold distance at which the shelf is visible is reduced. The imaging regions 200 also extend to regions other than perpendicular from the locations 110(1), 110(3), and 110(8) as such data may still be used with image registration techniques by the system.

For example, the system receives, as an input, an image of an inventory location that may be at a location other than perpendicular to the location 110 and determines bounding boxes around products and product spaces that are out of stock. As part of this determination, image registration may be performed to ensure a consistent view of the inventory location before performing the bounding box location. The bounding boxes may be determined based on identities of items expected to be in the inventory location, for example based on planogram data and/or surrounding item data. The system may then generate an alert if a restock action is needed, a reorganization, a cleaning, or other such action is warranted based on the updated image information at the inventory location.

The image registration may be used to determine exact inventory locations that need attention or are out of stock. In some examples, the image registration may be used for identifying updates or changes to inventory or status information stored by the system. Frontal images of the inventory locations are captured for the inventory locations and images from the carts may be matched and compared against such frontal images to determine portions of the inventory locations visible in the image data. Accordingly, when inventory locations are identified as out of particular inventory items, the items are identified for addressing by an associate after the system notifies an associate of the status update.

In some examples, the imaging regions 200 may be conveyed to the totes 108 with one or more additional trigger criteria that are satisfied before a particular tote 108 captures image data of a location 110. The information may provide location data to the totes 108 such that when a tote 108 is in a particular location, such as within imaging region 200(1), the imaging device 102 of the tote 108 may adjust a focal length or other imaging parameter such that the location 110(1) is in focus and capture image data. The trigger criteria may describe additional conditions to be fulfilled, such as the tote 108 being stationary, at or below a threshold velocity, not obscured from the location, not actively detecting an interaction or event at the location 110(1), or other such trigger criteria.

In some examples, the imaging devices 102 may be used to collect data regarding other locations such as floors, entryways, windows, and other such locations within a facility 100, for example to determine the state of different fixtures within the facility 100. In some examples, the imaging devices 102 may generate image data representing users 104. The data including the users 104 may be used to track interactions throughout the store and may additionally be used to provide information regarding user interactions, gaze directions, and actions with respect to the inventory locations that may be used by advertisers, producers, or other systems to improve one or more aspects of the facility 100.

In an example, the imaging devices 102 may generate image data representing the locations 110 when the tote 108 is within an imaging region 200 and the one or more trigger criteria are satisfied. For example, the imaging devices 102 may generate image data representing the inventory locations 106 when the tote 108 is within an imaging region 200, stationary, and not obscured from viewing the inventory location. In some examples the distance to the inventory location may be included as a trigger criteria such that the imaging region and distance to the inventory location 106 define the bounds of how near and far away from the inventory location the image data may be captured. The imaging device 102 and/or the tote 108 may then send the image data to the systems. Additionally, in some examples, the tote 108 may send additional data to the system(s), where the additional data represents at least a time period that the image data was generated, a location of the tote 108 when generating the image data, and/or any other information. Using the image data and/or this additional data, the system(s) may then perform one or more of the processes described herein in order to identify updates to a status of an item or fixture within the facility 100.

Figure 3:
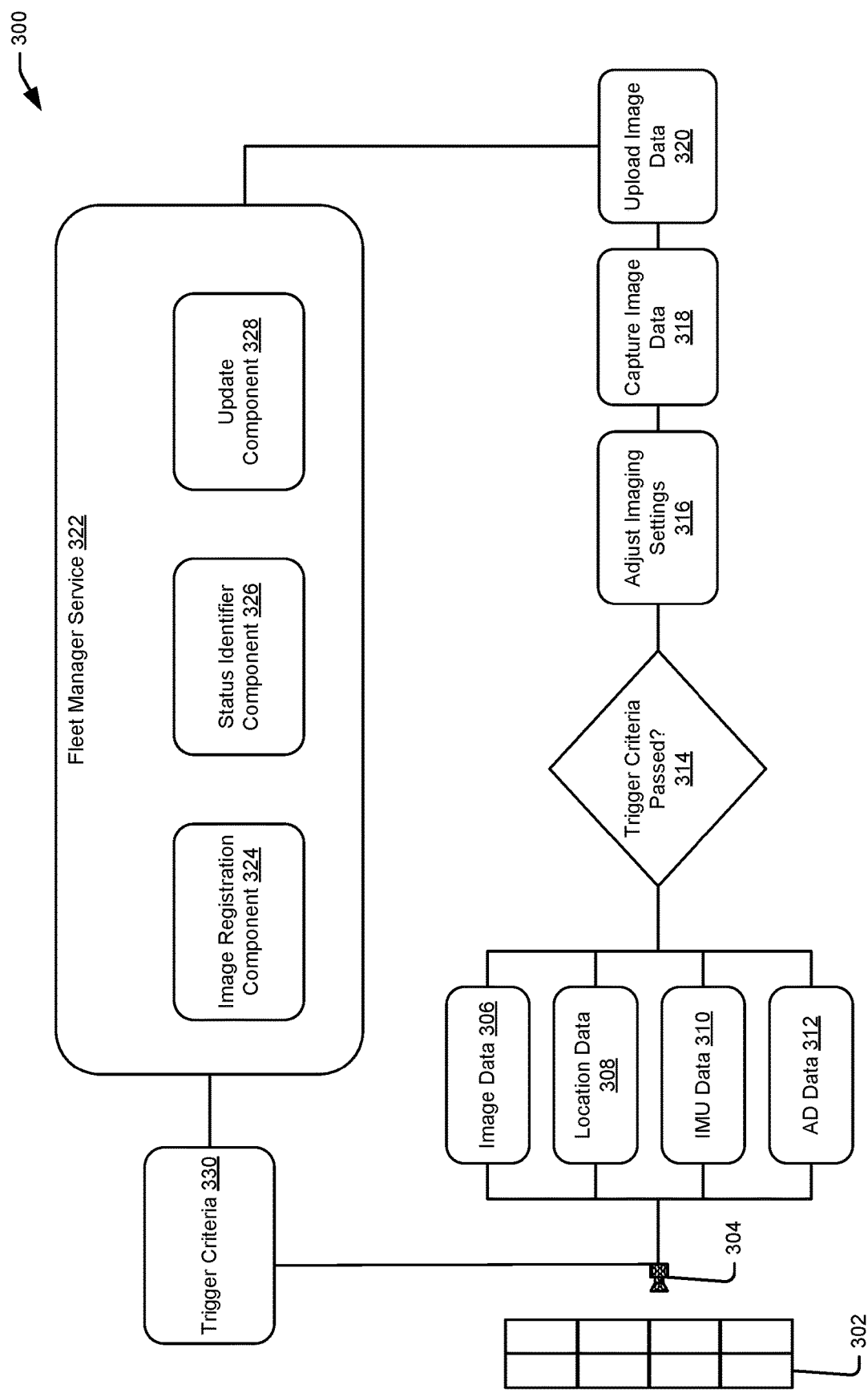
FIG. 3 illustrates an example block diagram showing components involved in orchestrating a fleet of devices for facility status updates, according to at least some examples.

FIG. 3 illustrates an example block diagram 300 showing components involved in orchestrating a fleet of devices for facility status updates, according to at least some examples. An imaging device 304 is shown within proximity of an inventory location 302 as shown and described with respect to the facility 100 of FIGS. 1 and 2. The imaging device 304 may be coupled to or integrated with an independently controlled device, such as a cart or tote that a user may direct around the facility. The imaging device is configured to produce image data 306 of the inventory location 302 and/or other portions of the facility as described herein. The device may also include one or more other sensors to detect information such as the location of the device within the facility, using GPS data, proximity data, or other such location data 308. The device may also include sensors to detect motion of the device and may generate inertial motion unit (IMU) data 310 and may also include activity detection sensors to produce activity detection (AD) data 312 describing activity or events of user interactions with one or more elements in the facility.

The data gathered by the device may be compared, at block 314, against trigger criteria 330 provided to the device from the fleet manager service 322, which may be embodied in one or more computing devices (e.g., servers) associated with the facility 100. In some examples, the trigger criteria 330 may include criteria for a particular location within the facility as well as other criteria that may be compared against the data gathered by the device. For example, an inertial measurement sensor may be used to determine IMU data 310 and thereby determine when the tote is in motion or is stationary. When the trigger criteria 330 are satisfied by the device, then the imaging device 304 captures image data 306 of the inventory location 302. In this manner, the imaging device 304 may be used to opportunistically capture image data of the inventory location 302 when requested by the fleet manager service 322.

The image data 306 may be captured by adjusting imaging settings 316 of the imaging device 304, for example to adjust a focal length of the imaging device to adjust for the distance to the inventory location and thereby produce clear image data. The image data 306 may be captured at 318 and uploaded to the fleet manager service 322 at block 320.

In some examples, the devices may be configured to upload image data at particular time periods and/or locations. For example, during use within the facility the device may be communicating with the system to update a virtual cart of a user and identify items placed within or associated with the device. Accordingly, image data captured by the device may not be communicated until the device is no longer using communication bandwidth for the aforementioned communications. Instead, data from the device may be uploaded when the device enters a corral or other standby location, is inactive for a threshold period of time, or otherwise is not actively communicating with the system for tracking the virtual cart of the user and thereby has bandwidth availability for communicating the high-resolution image data. In some examples the device may communicate at regular intervals, such as predetermined limited time windows throughout a session within the facility. In some examples, the device may communicate over different channels or networks to convey the image information to the fleet manager service 322, thereby reducing or eliminating any potential impact on the services used by a user during the automated checkout session.

The fleet manager service 322 is embodied on a server associated with the facility and handles processing of image data to determine a status of the facility based on the image data. The fleet manager service 322 is also configured to determine intervals for requesting new image data from the fleet of devices within the facility for updating the status of items within the facility. The fleet manager service 322 includes an image registration component 324, a status identifier component 326, and an update component 328.

The image registration component 324 may be used to determine exact inventory locations that need attention or are out of stock based on the image data 306. In some examples, the image registration component 324 may be used for identifying updates or changes to inventory or status information stored by the system. Frontal images of the inventory locations are captured for the inventory locations and images from the devices may be matched and compared against such frontal images to determine portions of the inventory locations visible in the image data as part of the image registration. Accordingly, when inventory locations are identified as out of particular inventory items, the items are identified for addressing by an associate after the system notifies an associate of the status update.

The status identifier component 326 is used for determining a status of the location. For example, the status may include determining a stock status or changes in stock status for an item. In some examples, the status identifier component 326 may be used for identifying updates or changes to inventory or status information stored by the system. After the image registration component 324 identifies the particular locations visible within the image data 306, the status identifier may determine items visible and items that may or may not need attention.

In the example, the status identifier component 326 receives, as an input, an image of an inventory location 302 and determines bounding boxes around products and product spaces that are out of stock. The image data may have previously passed through image registration to ensure a consistent perpendicular view of the inventory location 302 before performing the bounding box location. The bounding boxes may be determined based on identities of items expected to be in the inventory location, for example based on planogram data and/or surrounding item data. The system may then generate an alert if a restock action is needed, a reorganization, a cleaning, or other such action is warranted based on the updated image information at the inventory location.

The update component 328 generates an update to one or more tracking systems of the facility. The update component 328 may communicate with an inventory system to update a number of items present at the inventory location. In some examples the update component may generate one or more alerts to either cause an associated to direct attention to the area for addressing a problem (e.g., cleaning) or to restock with additional items.

The fleet manager service 322 may continually provide additional trigger criteria 330 to the devices, including inventory locations, imaging regions, and other trigger criteria for the devices to capture image data when the trigger criteria are fulfilled during a user's session with the device, thereby opportunistically capturing the image data and keeping the fleet manager service 322 and other facility systems up to date.

Figure 4A:
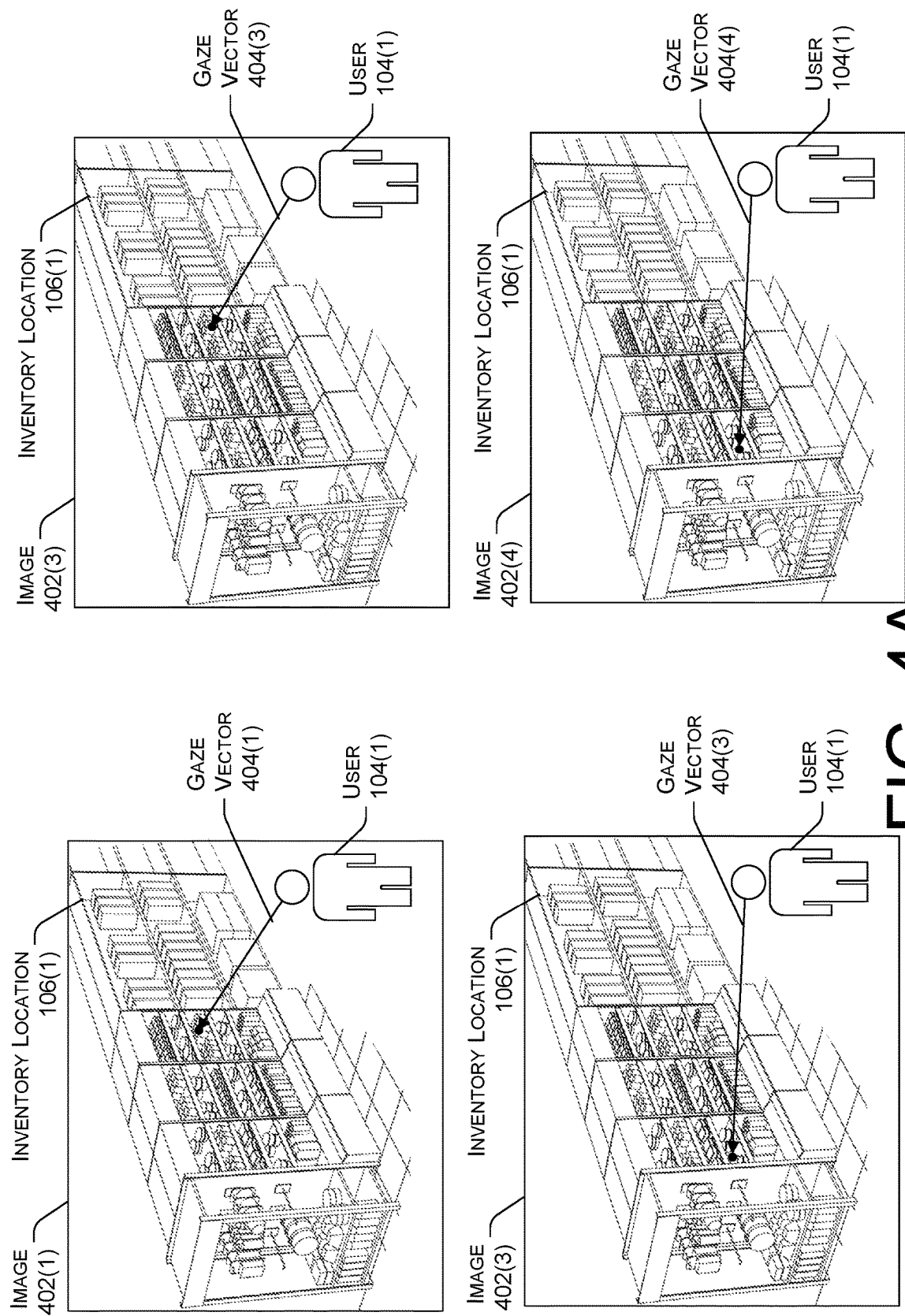
FIGS. 4A-4B illustrate an example of analyzing image data from independently controlled devices using one or more gaze estimation techniques in order to determine gaze points associated with an inventory location, according to at least some examples.
Figure 4B:
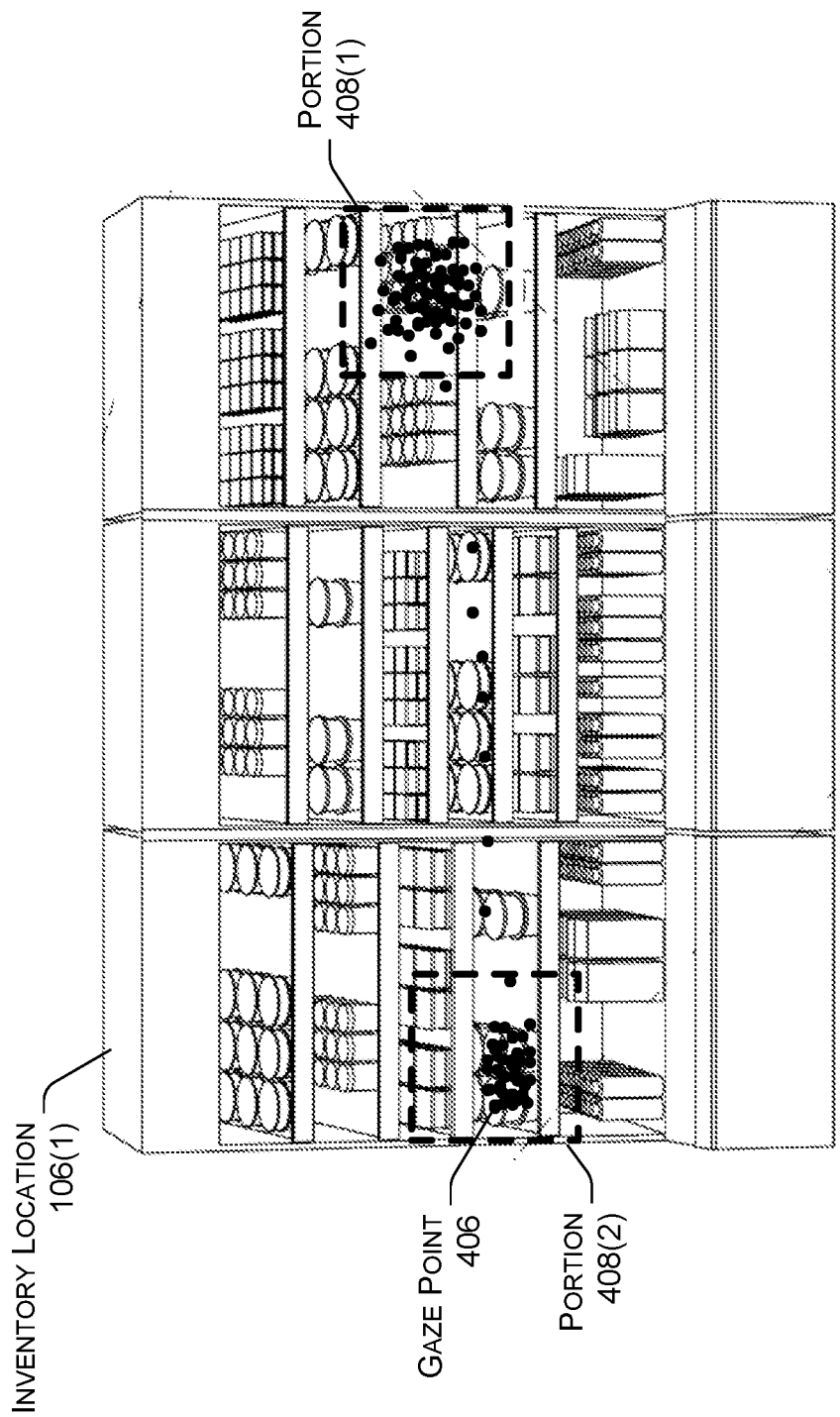

FIGS. 4A-4B illustrate an example of analyzing image data from independently controlled devices using one or more gaze estimation techniques in order to determine gaze points associated with an inventory location, according to at least some examples. In some examples, the fleet manager service 322 may cause the imaging devices to capture data of users or user interactions with inventory locations for various purposes, such as to further provide user interaction analytics with inventory locations and updates to planogram data and analytics.

For example, FIGS. 4A-4B illustrate an example of analyzing the image data using one or more gaze estimation techniques in order to determine gaze points associated with the inventory location 106(1), in accordance with examples of the present disclosure. As shown by the example of FIG. 4A, the system(s) may receive, from the imaging device 102(4), the image data that represents images 402(1)-(4) (also referred to as "images 402" and/or "frames 402") of a video. In the example of FIG. 4A, the video depicts the user 104(1) looking at the inventory location 106(1) while shopping within the facility 100. In the example of FIG. 4A, the user 104(1) is looking at different portions of the inventory location 106(1), such as at different items located at the inventory location 106(1). The system(s) may analyze the image data using one or more gaze estimation techniques in order to determine gaze points of the user 104(1) on the inventory location 106(1).

For example, the system(s) may analyze the image data representing the first image 402(1) in order to determine a first gaze vector 404(1) of the user 104(1). In some examples, to determine the first gaze vector 404(1), the system(s) may initially analyze the image data to determine the location of the head, the location(s) of the eye(s), the location(s) of the pupil(s), and/or the like of the user 104(1). The system(s) may then use the location of the head, the location(s) of the eye(s), the location(s) of the pupil(s), and/or the location of the user 104(1) within the first image 402(1) to determine the first gaze vector 404(1). Additionally, the system(s) may then use the gaze vector 404(1) to determine a location for a first gaze point on the inventory location 106(1), wherein the first gaze point is represented by the solid circle at the end of the arrow of the gaze vector 404(1). The system(s) may then perform similar processes in order to determine the gaze vectors 404(2)-(4) and the gaze points for the other images 402(2)-(4) represented by the image data.

While the example of FIG. 4A only illustrates analyzing four images 402 represented by the image data, in other examples, the system(s) may analyze any number of images represented by the image data. For example, and when each image represents a frame of the image data, the system(s) may analyze every frame, every other frame, every fifth frame, and/or any other combination of frames. For another example, the system(s) may analyze a frame every millisecond, every second, every two seconds, and/or any other time period. In either of the examples, and as illustrated in the example of FIG. 4B, the system(s) may determine multiple gaze points associated with the user 104(1) over a period of time.

For instance, and as shown by the example of FIG. 4B, based on analyzing the image data using the gaze estimation technique(s), the system(s) may identify the locations of multiple gaze points 406 located on the inventory location 106(1), although only one is labeled for clarity reasons. As shown, the gaze points 406 indicate that the user 104(1) was initially looking at a first portion 408(1) of the inventory location 106(1) for a first period of time. After the first period of time, the user 104(1) then changed their focus and looked at a second portion 408(2) of the inventory location 106(1) for a second period of time. Additionally, FIG. 4B illustrates that there are a few gaze points 406 located between the first portion 408(1) of the inventory location 106(1) and the second portion 408(2) of the inventory location 106(1). This may be because the user 104(1) had to look across the inventory location 106(1) when switching from looking at the first portion 408(1) to looking at the second portion 408(2). These gaze points 406 may be associated with impressions.

As discussed herein, the system(s) may use one or more gaze estimation techniques when analyzing the image data. For a first example, the system(s) may use one or more gaze estimation techniques that use closeup face images to estimate the gaze of a user by relying mostly on the eyes of the user. For these techniques, the system(s) may need a clear view of the pupil in order to determine the pupil center, the center of the curvature of the cornea, the optical and visual axes, and/or the like. For a second example, the system(s) may use one or more gaze estimation techniques that use cropped images of the head of the user in order to determine the pose of the head which is parameterized by yaw, pitch, and roll. These techniques then use the pose in order to determine the focal point of the user.

For a third example, the system(s) may use one or more gaze estimation techniques that use two distinct processing pathways, where a first pathway (e.g., the saliency pathway) uses a full image and a second pathway (e.g., the gaze pathway) uses the cropped image of the head of the user. Given the image and the location of the head, this approach follows the gaze of the user and identifies the object being looked at by the user. For example, the second pathway, which only has access to the image of the head of the user and the location of the user, predicts the gaze direction which may be used to generate the gaze vector. The first pathway, which has access to the full image, predicts the salient objects (e.g., the inventory locations) that are independent of the user's viewpoint. This is because the first pathway may not know the person from the image to follow and, as such, the first pathway determines the salient objects that are independent of the person's viewpoint. The system(s) then use the outputs from these two pathways in order to determine gaze points on the salient object.

For this third example, the second pathway may output a first spatial map that includes a given size, where the first spatial map indicates the gaze directions of the person. In some examples, a convolutional network (and/or other type of artificial neural network) is used on the cropped image in order to generate the first spatial map. Additionally, the first pathway may output another spatial map that also include the given size, where the second spatial map indicates the salient objects represented by the full image. In some examples, a convolutional network (and/or other type of artificial neural network) is again used on the full image in order to generate the second spatial map. In some examples, the second spatial map may further represent the importance of the salient objects depicted by the full image. These two spatial maps are then combined in order to determine gaze points of the person on one or more of the salient objects. In some examples, the two spatial maps are combined using an element-wise product in order to determine the gaze points.

For a fourth example, and as an extension to the one or more gaze estimation techniques described in the third example, the second pathway may estimate a two-dimensional gaze direction vector instead of producing a directional gaze mask. Using the gaze direction vector, the gaze direction field is calculated which measures the probability of each point being the gaze point. The gaze direction fields are then combined with scene contents by concatenating the original image which infers the gaze point. These gaze estimation technique(s) may eliminate the need for the first pathway.

For a fifth example, a spatiotemporal gaze architecture may be used to determine the gaze points, where the spatiotemporal gaze architecture uses three branches. A first branch, which may include a head conditioning branch, computes a head feature map from a cropped image of the head of the person of interest. The head feature map is then concatenated with a head position feature. Additionally, an attention map is then computed by passing the head feature map and the head position feature through a fully-connected layer. A second branch, which may include a main scene branch, then computes a scene feature map using a "Scene Convolution" part of a network. Input to the "Scene Convolution" is a concatenation of a scene image and a head position image. This scene feature map is then multiplied by the attention map computed by the first branch. Additionally, the head feature map is concatenated to the weighted scene feature map. Furthermore, the concatenated features are encoded using two convolutional layers in an "Encode" module.

A third branch, which may include a recurrent attention prediction module, then integrates temporal information from a sequence of frames using a convolution network. A deconvolutional network comprised of four deconvolution layers then up-samples the features computed by the convolution network into a full-sized feature map. The full-sized feature map is then modulated by a scalar that quantifies whether the person's focus of attention is located inside or outside of the image. This generates a final heatmap that quantifies the location and intensity of the predicted attention target in the image. The final heatmap is then overlayed on the input image in order to output a final visualization.

In one or more of the gaze estimation techniques described above, the gaze estimation technique(s) may be scene aware. This scene awareness is achieved using a saliency pathway of the model architecture and the definition of the saliency is customizable according to the domain in which the system(s) would like to use the gaze estimation technique(s). For instance, and for a grocery store, the items on the shelf may be labelled as the salient points. Additionally, for a clothing store, the clothes displayed on the shelf or hanging on the racks may be labelled as the salient points. Furthermore, for a warehouse like facility, the shelves and/or racks may be labelled as the salient points. In other words, the system(s) are able to customize the salient points according to the type of facility. This may help increase the accuracy of the system(s) when using gaze estimation to identify interactions between the users and the inventory locations within different types of facilities.

While the examples above describe different gaze estimation techniques that may be used in order to determine the gaze points on an inventory location, in other examples, additional and/or alternative gaze estimation techniques may be used.

The gaze estimations and gaze points 406 discussed with respect to FIGS. 4A and 4B may represent examples of other data that may be gathered using the imaging devices 102 throughout the facility 100. The gaze information may be gathered at intervals, such as then users are detected in particular locations for studying a layout or planogram of the facility and subsequently uploaded for analysis and adjustment of a layout of the facility for ease of navigation and use by users.

Figure 5:
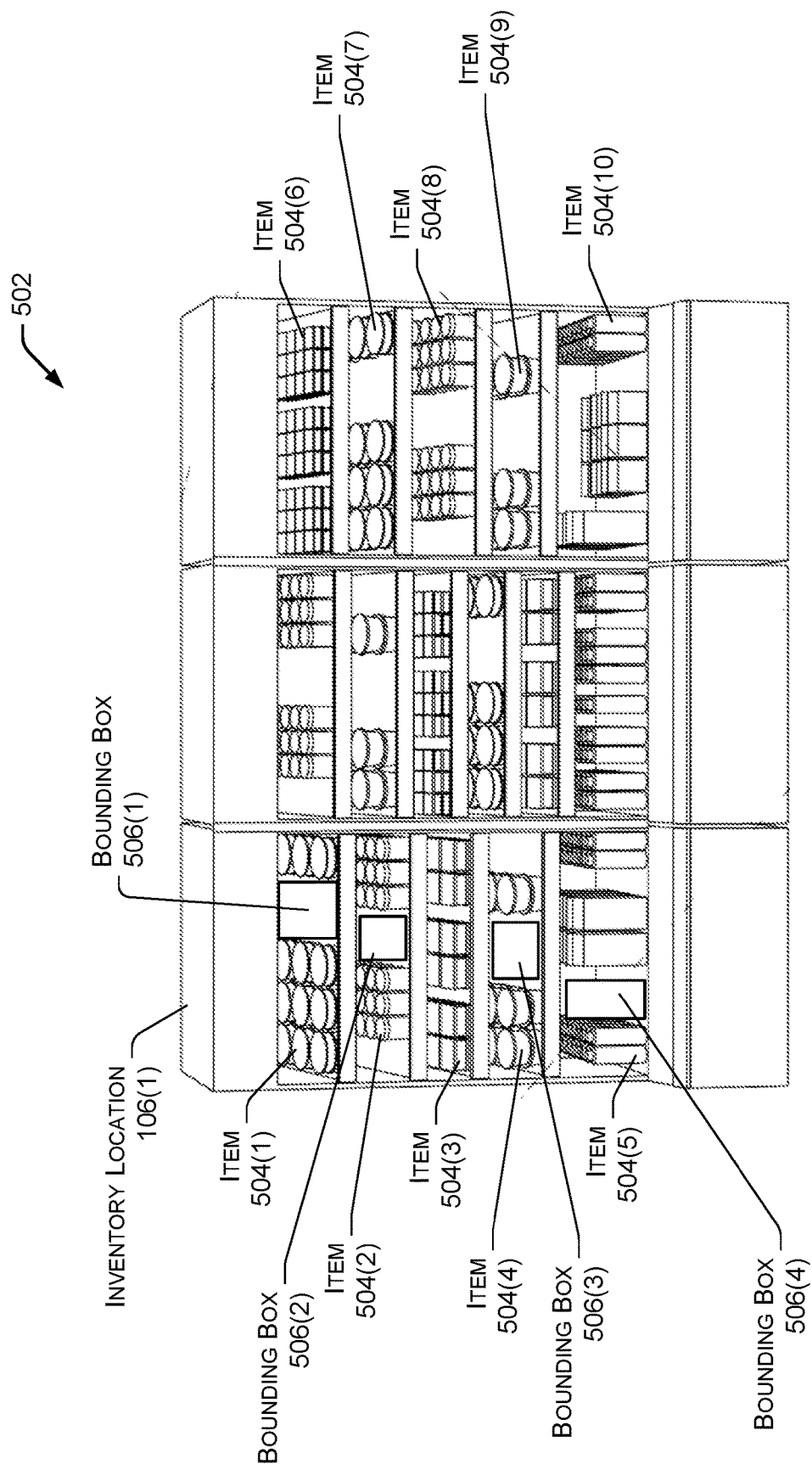
FIG. 5 illustrates an example of identifying items and inventory status, according to at least some example.

FIG. 5 illustrates an example of identifying items and inventory status, according to at least some example. In FIG. 5, the inventory location 106(1) is illustrated with the labeled items 504. The illustration in FIG. 5 may represent image data of the inventory location 106(1) with bounding boxes 506 showing indications of locations where items are out of stock on the inventory location 106(1).

As discussed above, the system(s) may initially identify the inventory location 106(1) based on the heat map of the freshness score, based on a timestamp of update data, or other such information indicative of a previous time when the inventory location 106(1) was analyzed for item updates. In some examples, the items within the inventory location 106(1) may be identified based on identifiers visible in the image data, such as QR codes, barcodes, and the like. In some examples, the system may use planogram data to further identify the portions of the inventory location 106(1) where items are located or should be located.

In an example, the system receives the image data from the imaging device 102 as described above, after the image data is captured by the imaging device 102 and subsequently uploaded to the fleet service manager 322 as described herein. The system then registers the image data as described herein and determines the bounding boxes 506 around products and/or product spaces that are out of stock. As part of this determination, image registration may be performed to ensure a consistent perpendicular view of the inventory location before performing the bounding box location. The bounding boxes 506 may be determined based on identities of items expected to be in the inventory location, for example based on planogram data and/or surrounding item data. The system may then generate an alert if a restock action is needed, a reorganization, a cleaning, or other such action is warranted based on the updated image information at the inventory location.

FIG. 6 illustrates an example of metrics for inventory locations with associated statuses, according to at least some examples. For example, FIG. 6 illustrates an example of metrics that represent the status for various inventory locations 106 within the facility 100. As shown, the metrics 602 may include at least an inventory location identifier 604, a status 606, and a timestamp 608 associated with the status 606. In the example of FIG. 6, the metrics 602 represents five different inventory locations 106. However, in other examples, the metrics 602 may represent any number of inventory locations 106 throughout a facility. In some examples information other than inventory locations may be tracked, such as cleanliness in common areas, fixture positions or status, and other such information.

While the example of FIG. 6 illustrates providing the metrics 602 in a table with rows and columns, in other examples, the system(s) may provide the metrics 602 using any other technique. Additionally, while the example of FIG. 6 illustrates the metrics 602 as being specific to the inventory locations 106, in other examples, the metrics 602 may be general to users, facilities, spaces, fixtures, and other such information. In such examples, the metrics 602 may not include the inventory location identifier. Additionally, the timestamps 608 may include aggregate periods of time for each of the users that looked at the inventory location 106 for gaze tracking applications, or may include a single time when image data was captured.

As discussed above, more than one of the imaging devices 102 located within the facility 100 may generate image data representing the same inventory location 106 during the same time period. Because of this, the system(s) may select which image data to analyze in order to perform the processes described herein.

Figure 7:
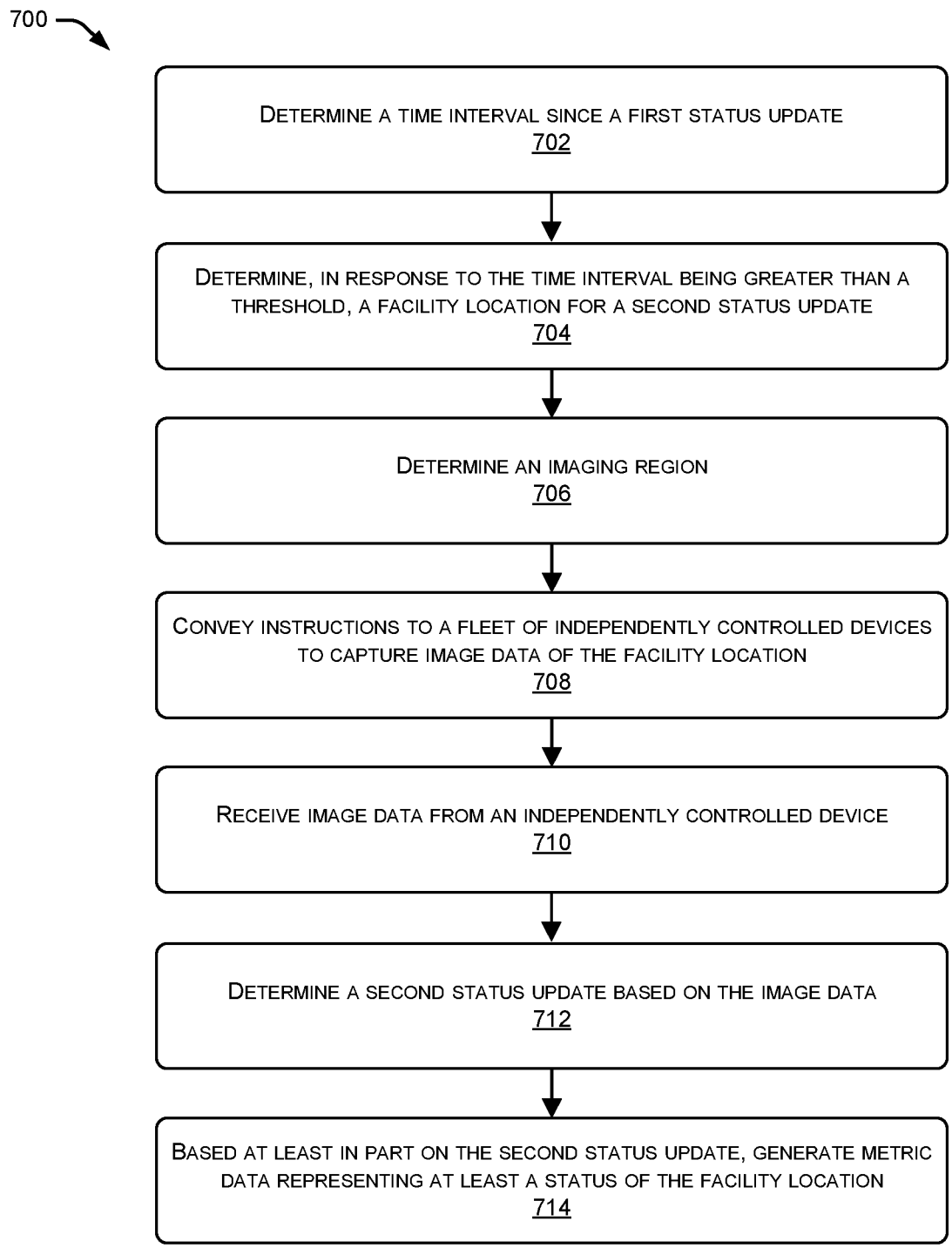
FIG. 7 illustrates an example process for instructing a fleet of independently controlled devices to gather facility status information, according to at least some examples.
Figure 8:
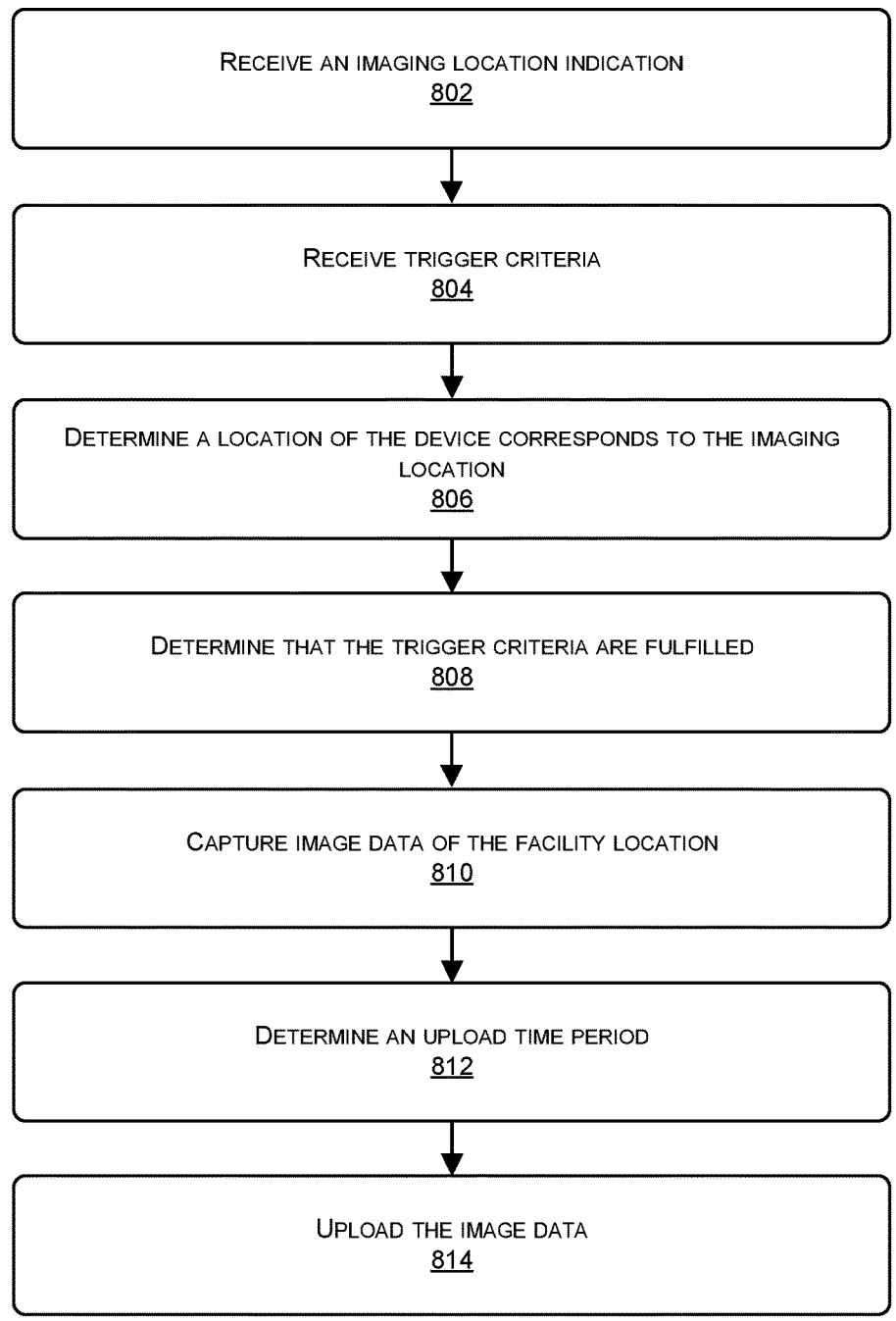
FIG. 8 illustrates an example process for capturing and uploading facility status information using an independently controlled device, according to at least some examples.

FIGS. 7-8 illustrate various processes for identifying interactions between users and inventory locations. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 7 illustrates an example process for instructing a fleet of independently controlled devices to gather facility status information, according to at least some examples. The process 700 includes steps that may be performed by a computing device (e.g., server) of the facility 100 for updating status information for the facility and/or items within the facility.

At 702, the process 700 includes determining a time interval since a first status update. The time interval may be determined based on a timestamp of the first status update, such as a time difference between a last inventory location status update and a present time. In some examples, the time interval may include determining a freshness score, with the freshness score determined based on the time elapsed, the type of product and/or location, and other such factors.

At 704, the process 700 includes determining, in response to the time interval being greater than a threshold, a facility location for a second status update. The time interval associated with a particular inventory location, such as shown and described with respect to FIG. 6, may be compared against a threshold to determine that the inventory location is due for a status update. In some examples, the determination may further be based on a heat map of the time elapsed since a status update and/or a freshness score, with a most stale inventory location or lowest freshness score selected with the associated inventory location for updating.

At 706, the process 700 includes determining an imaging region. In some examples, the imaging regions may be defined by the system, with the imaging regions describing a region within which the cart may capture image data of the inventory location. In some examples, the inventory location may be a high or low shelf that requires the cart to be at least a minimum threshold distance from the inventory location so that the shelf is visible. In some examples the minimum threshold distance may be smaller for shelved at a height at or around the height of the imaging device of the cart. Additional sensors such as an inertial motion unit, proximity sensor, distance sensor, and other such sensors may be used to determine whether the trigger criteria are fulfilled before capturing the image data of the inventory location when within an imaging region. Additionally, the imaging sensor settings may include settings to describe aperture and/or focal length or other settings of the imaging sensor for gathering information about the inventory location.

At 708, the process 700 includes conveying instructions to a fleet of independently controlled devices to capture image data of the facility location. The instructions may include the inventory location to image, the location of the imaging region, and may also include one or more additional trigger criteria that may cause the independently controlled device to capture image data in response to the trigger criteria being satisfied.

At 710, the process 700 includes receiving image data from an independently controlled device. The image data may be received after the device has uploaded image data following a session of use by a user, may be uploaded at or near real-time with the capture time, or may otherwise be uploaded when the device is in a standby mode and/or location.

At 712, the process 700 includes determining a second status update based on the image data. The second status update may be determined by processing the image data to identify the location and items within the location. In some examples, the update may be performed by determining bounding boxes around products and/or around empty regions at the location where products may be placed. Based on the location and/or planogram data, the system may determine an identity of the items for the update. In some examples, the image data may include one or more identifiers of the items at the location that may be used to identify the items and/or the items missing from the location.

At 714, the process 700 includes, based at least in part on the second status update, generating metric data representing at least a status of the facility location. The metric data may include an update to an inventory system or other facility tracking system. in some examples, an alert may be generated in response to a number of items at the location being below a threshold, the alert indicating a restock is needed.

FIG. 8 illustrates an example process for capturing and uploading facility status information using an independently controlled device, according to at least some examples. The process 800 may be performed by an independently controlled device equipped with an imaging device, such as a cart equipped with one or more cameras as described herein.

At 802, the process 800 includes receiving an imaging location indication. The imaging location indication may include a location at which the device may be positioned to capture image data of a facility location. The imaging location may include a region within the facility where the imaging device of the independently controlled device may capture high-resolution image data of the inventory location.

At 804, the process 800 includes receiving trigger criteria associated with the imaging location indication. The trigger criteria may be received from a server of the facility and may describe one or more conditions associated with preconditions for the device to capture image data at the imaging location, such as a motion condition, proximity condition, activity condition, and other such conditions.

At 806, the process 800 includes determining a location of the device corresponds to the imaging location. The device may include components for determining the location of the device within the facility and may determine that the location corresponds to the imaging location. In some examples, the location may be within a threshold distance of the imaging location.

At 808, the process 800 includes determining that the trigger criteria are fulfilled. The trigger criteria may be fulfilled simultaneously with the device being located at the imaging location. In the event that the trigger criteria and imaging location are all reached by the device, the process 800 may proceed to 810.

At 810, the process 800 includes capturing image data of the facility location. The imaging device of the device may capture image data by adjusting one or more imaging characteristics such as focus, depth of field, field of view, or other such parameters and storing image data captured by the imaging device.

At 812, the process 800 includes determining an upload time period. The upload time period may be determined based on available network bandwidth within the facility. In some examples, the device may upload the image data in response to the network bandwidth reaching and/or exceeding a threshold level. In some examples, the upload time period may be based on the status or activity of the device and/or the location of the device. The device may determine to upload the image data while in a standby mode, while in a waiting area such as a cart corral, or other such location.

At 814, the process 800 includes uploading the image data. The image data may be uploaded to the server associated with the facility and may be processed as described herein, such as with respect to FIG. 7 to determine a status update for the facility. In some examples, the carts or devices may maintain the images captured in on-board memory and only upload when selected by the system. For example, the system may monitor carts located in a corral or other standby location and may select a cart for uploading based on the freshness (e.g., timestamp) of the image data stored thereon. In this manner, multiple carts may gather image data of the location, but only one may be selected to upload, either based on returning to the standby location first or by having the most up to date image when the upload time arrives.

In some examples, the devices may communicate with one another and/or with the system to convey when image data of a particular location is captured such that further carts need not capture image data of the location redundantly. Such communications may use small file-size communications that indicate a location and timestamp associated with an image capture rather than conveying the entire high-resolution image across the network.

Figure 9:
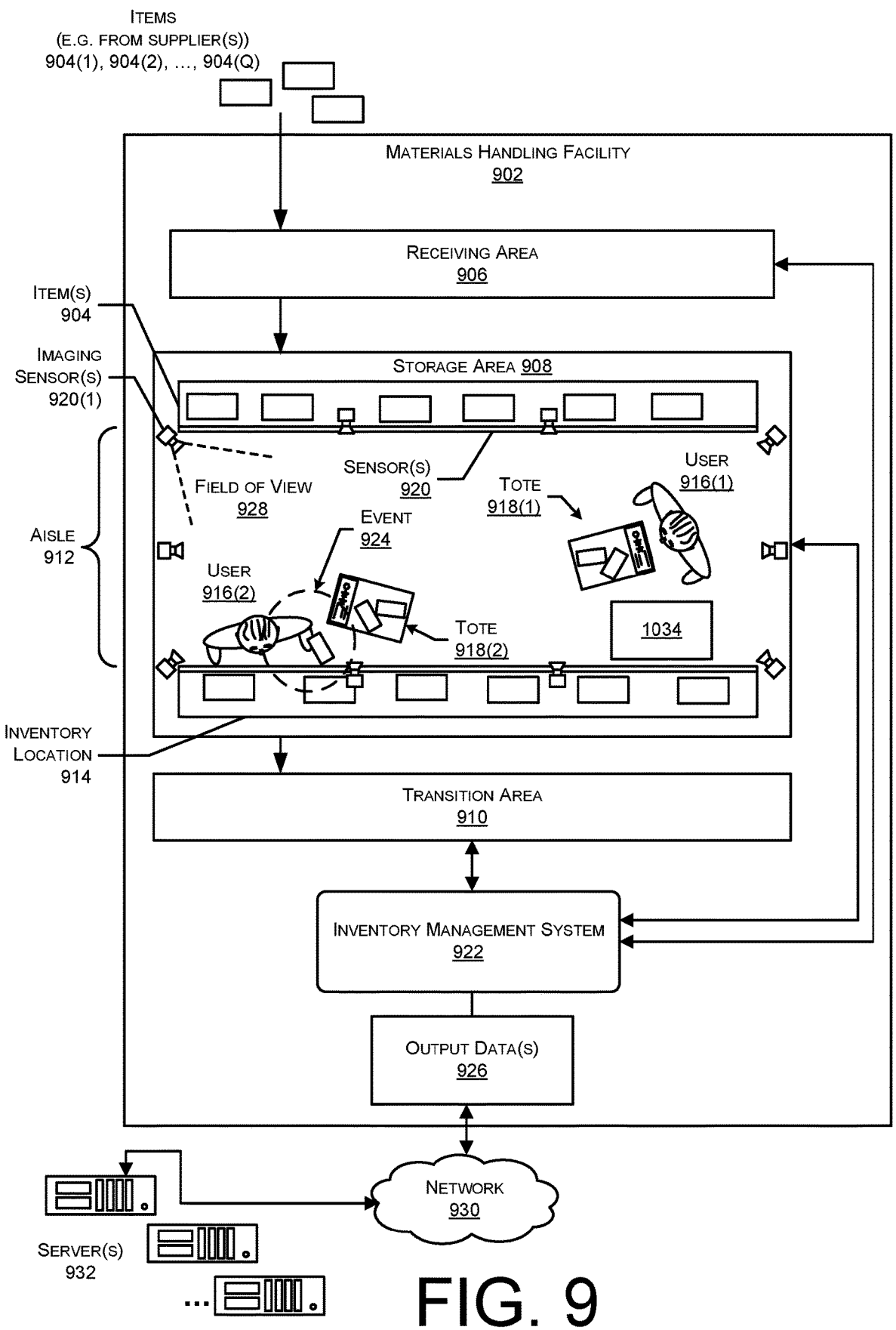
FIG. 9 is a block diagram of an example materials handling facility that includes sensors and an inventory management system configured to generate output regarding events occurring in the facility using the sensor data.
Figure 10:
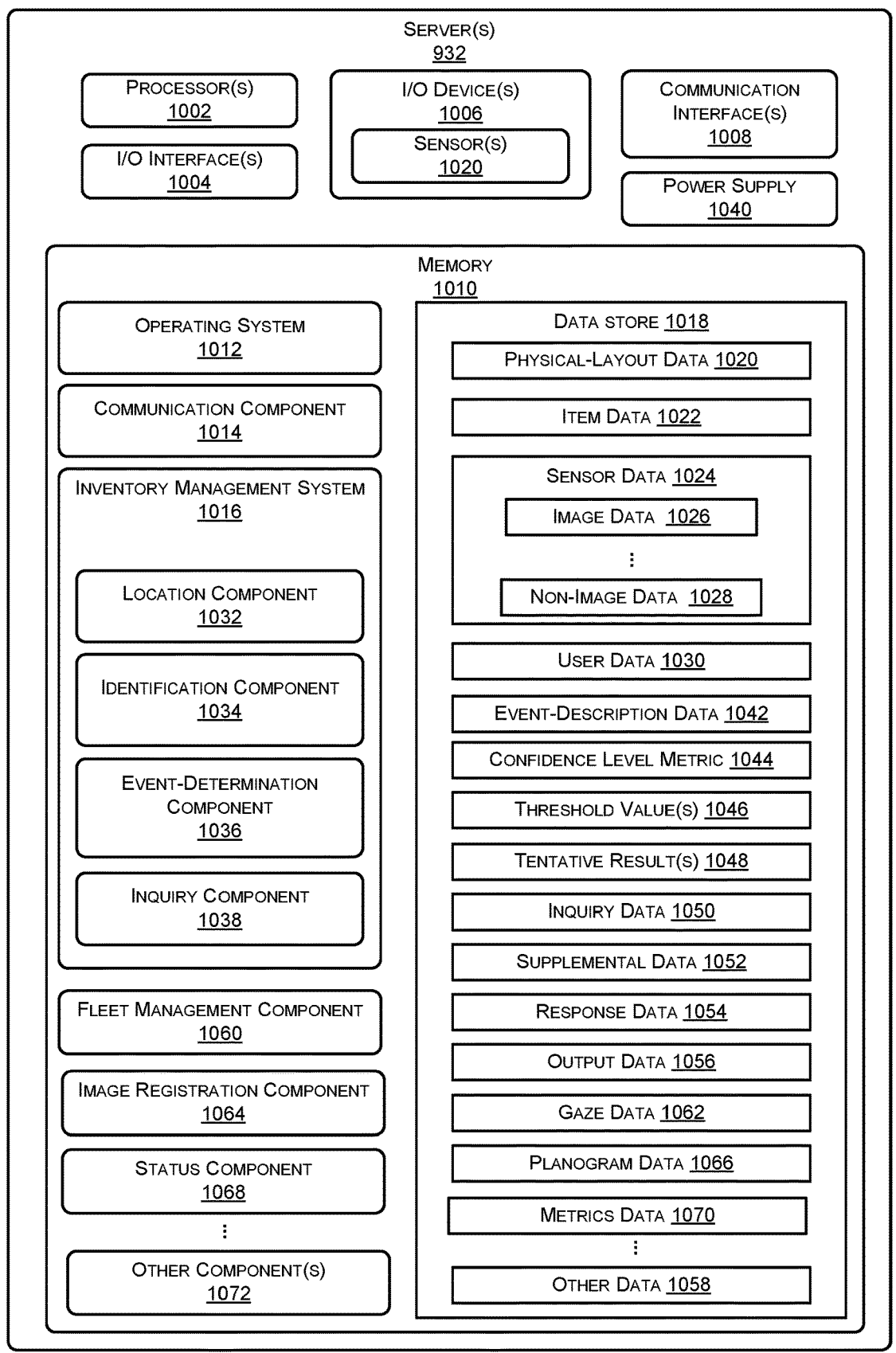
FIG. 10 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 9 and 10 represent an illustrative materials handling environment, such as the materials handling facility 902 (which may represent, and/or include, the facility 206), in which the techniques described herein may be applied to cameras monitoring the environments as described below. However, the following description is merely one illustrative example of an industry and environment in which the techniques described herein may be utilized. The materials handling facility 902 (or "facility") comprises one or more physical structures or areas within which one or more items 904(1), 904(2), . . . , 904(Q) (generally denoted as 904) may be held. As used in this disclosure, letters in parentheses such as "(Q)" indicate an integer result. The items 904 comprise physical goods, such as books, pharmaceuticals, repair parts, electronic gear, groceries, and so forth.

The facility 902 may include one or more areas designated for different functions with regard to inventory handling. In this illustration, the facility 902 includes a receiving area 906, a storage area 908, and a transition area 910. The receiving area 906 may be configured to accept items 904, such as from suppliers, for intake into the facility 902. For example, the receiving area 906 may include a loading dock at which trucks or other freight conveyances unload the items 904.

The storage area 908 is configured to store the items 904. The storage area 908 may be arranged in various physical configurations. In one example, the storage area 908 may include one or more aisles 912. The aisle 912 may be configured with, or defined by, inventory locations 914 on one or both sides of the aisle 912. The inventory locations 914 may include one or more of shelves, racks, cases, cabinets, bins, floor locations, or other suitable storage mechanisms for holding or storing the items 904. The inventory locations 914 may be affixed to the floor or another portion of the facility's structure, or may be movable such that the arrangements of aisles 912 may be reconfigurable. In some examples, the inventory locations 914 may be configured to move independently of an outside operator. For example, the inventory locations 914 may comprise a rack with a power source and a motor, operable by a computing device to allow the rack to move from one location within the facility 902 to another.

One or more users 916(1), 916(2) (generally denoted as 916), totes 918(1), 918(2) (generally denoted as 918) or other material handling apparatus may move within the facility 902. For example, the users 916 may move about within the facility 902 to pick or place the items 904 in various inventory locations 914, placing them on the totes 918 for ease of transport. An individual tote 918 is configured to carry or otherwise transport one or more items 904. For example, a tote 918 may include a basket, a cart, a bag, and so forth. In other examples, other agencies such as robots, forklifts, cranes, aerial drones, and so forth, may move about the facility 902 picking, placing, or otherwise moving the items 904.

One or more sensors 920 may be configured to acquire information in the facility 902. The sensors 920 in the facility 902 may include sensors fixed in the environment (e.g., ceiling-mounted cameras) or otherwise, such as sensors in the possession of users (e.g., mobile phones, tablets, etc.). The sensors 920 may include, but are not limited to, sensors 920(1), weight sensors, radio frequency (RF) receivers, temperature sensors, humidity sensors, vibration sensors, and so forth. The sensors 920 may be stationary or mobile, relative to the facility 902. For example, the inventory locations 914 may contain sensors 920(1) configured to acquire images of pick or placement of items 904 on shelves, of the users 916(1) and 916(2) in the facility 902, and so forth. In another example, the floor of the facility 902 may include weight sensors configured to determine a weight of the users 916 or another object thereupon.

During operation of the facility 902, the sensors 920 may be configured to provide information suitable for tracking how objects move or other occurrences within the facility 902. For example, a series of images acquired by a sensor 920(1) may indicate removal of an item 904 from a particular inventory location 914 by one of the users 916 and placement of the item 904 on or at least partially within one of the totes 918.

While the storage area 908 is depicted as having one or more aisles 912, inventory locations 914 storing the items 904, sensors 920, and so forth, it is understood that the receiving area 906, the transition area 910, or other areas of the facility 902 may be similarly equipped. Furthermore, the arrangement of the various areas within the facility 902 is depicted functionally rather than schematically. For example, multiple different receiving areas 906, storage areas 908, and transition areas 910 may be interspersed rather than segregated in the facility 902.

The facility 902 may include, or be coupled to, an inventory management system 922, which may perform some or all of the techniques described above with reference to FIGS. 1-8. For example, the inventory management system 922 may maintain a virtual cart of each user within the facility. The inventory management system 922 may also store a record associated with each user indicating the location of the user, and whether the user is eligible to exit the facility with one or more items without performing a manual checkout of the items. The inventory management system 922 may also generate and output notification data to the users, indicating whether or not they are so eligible.

As illustrated, the inventory management system 922 may reside at the facility 902 (e.g., as part of on-premises servers), on the servers 932 that are remote from the facility 902, a combination thereof. In each instance, the inventory management system 922 is configured to identify interactions and events with and between users 916, devices such as sensors 920, robots, material handling equipment, computing devices, and so forth, in one or more of the receiving area 906, the storage area 908, or the transition area 910. As described above, some interactions may further indicate the existence of one or more events 924, or predefined activities of interest. For example, events 924 may include the entry of the user 916 to the facility 902, stocking of items 904 at an inventory location 914, picking of an item 904 from an inventory location 914, returning of an item 904 to an inventory location 914, placement of an item 904 within a tote 918, movement of users 916 relative to one another, gestures by the users 916, and so forth. Other events 924 involving users 916 may include the user 916 providing authentication information in the facility 902, using a computing device at the facility 902 to authenticate the user to the inventory management system 922, and so forth. Some events 924 may involve one or more other objects within the facility 902. For example, the event 924 may comprise movement within the facility 902 of an inventory location 914, such as a counter mounted on wheels. Events 924 may involve one or more of the sensors 920. For example, a change in operation of a sensor 920, such as a sensor failure, change in alignment, and so forth, may be designated as an event 924. Continuing the example, movement of a sensor 920(1) resulting in a change in the orientation of the field of view 928 (such as resulting from someone or something bumping the sensor 920(1)) may be designated as an event 924.

By determining the occurrence of one or more of the events 924, the inventory management system 922 may generate output data 926. The output data 926 comprises information about the event 924. For example, where the event 924 comprises an item 904 being removed from an inventory location 914, the output data 926 may comprise an item identifier indicative of the particular item 904 that was removed from the inventory location 914 and a user identifier of a user that removed the item.

The inventory management system 922 may use one or more automated system(s) to generate the output data 926. For example, an artificial neural network, one or more classifiers, or other automated machine learning techniques may be used to process the sensor data from the one or more sensors 920 to generate output data 926. For example, the inventory management system 922 may perform some or all of the techniques for generating and utilizing a classifier for identifying user activity in image data, as described in detail above. The automated system(s) may operate using probabilistic or non-probabilistic techniques. For example, the automated system(s) may use a Bayesian network. In another example, the automated system(s) may use support vector machines to generate the output data 926 or the tentative results. The automated system(s) may generate confidence level data that provides information indicative of the accuracy or confidence that the output data 926 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 99%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 904, user 916, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 916 may pick an item 904(1) such as a perfume bottle that is generally cubical in shape from the inventory location 914. Other items 904 at nearby inventory locations 914 may be predominantly spherical. Based on the difference in shape (cube vs. sphere) from the adjacent items, and the correspondence in shape with the previously stored image of the perfume bottle item 904(1) (cubical and cubical), the confidence level that the user has picked up the perfume bottle item 904(1) is high.

In some situations, the automated techniques may be unable to generate output data 926 with a confidence level above a threshold result. For example, the automated techniques may be unable to distinguish which user 916 in a crowd of users 916 has picked up the item 904 from the inventory location 914. In other situations, it may be desirable to provide human confirmation of the event 924 or of the accuracy of the output data 926. For example, some items 904 may be deemed age restricted such that they are to be handled only by users 916 above a minimum age threshold.

In instances where human confirmation is desired, sensor data associated with an event 924 may be processed to generate inquiry data. The inquiry data may include a subset of the sensor data associated with the event 924. The inquiry data may also include one or more of one or more tentative results as determined by the automated techniques, or supplemental data. The subset of the sensor data may be determined using information about the one or more sensors 920. For example, camera data such as the location of the sensor 920(1) within the facility 902, the orientation of the sensor 920(1), and a field of view 928 of the sensor 920(1) may be used to determine if a particular location within the facility 902 is within the field of view 928. The subset of the sensor data may include images that may show the inventory location 914 or that the item 904 was stowed. The subset of the sensor data may also omit images from other sensors 920(1) that did not have that inventory location 914 in the field of view 928. The field of view 928 may comprise a portion of the scene in the facility 902 that the sensor 920 is able to generate sensor data about.

Continuing the example, the subset of the sensor data may comprise a video clip acquired by one or more sensors 920(1) having a field of view 928 that includes the item 904. The tentative results may comprise the "best guess" as to which items 904 may have been involved in the event 924. For example, the tentative results may comprise results determined by the automated system that have a confidence level above a minimum threshold.

The facility 902 may be configured to receive different kinds of items 904 from various suppliers and to store them until a customer orders or retrieves one or more of the items 904. A general flow of items 904 through the facility 902 is indicated by the arrows of FIG. 9. Specifically, as illustrated in this example, items 904 may be received from one or more suppliers, such as manufacturers, distributors, wholesalers, and so forth, at the receiving area 906. In various examples, the items 904 may include merchandise, commodities, perishables, or any suitable type of item 904, depending on the nature of the enterprise that operates the facility 902. The receiving of the items 904 may comprise one or more events 924 for which the inventory management system 922 may generate output data 926.

Upon being received from a supplier at receiving area 906, the items 904 may be prepared for storage. For example, items 904 may be unpacked or otherwise rearranged. The inventory management system 922 may include one or more software applications executing on a computer system to provide inventory management functions based on the events 924 associated with the unpacking or rearrangement. These inventory management functions may include maintaining information indicative of the type, quantity, condition, cost, location, weight, or any other suitable parameters with respect to the items 904. The items 904 may be stocked, managed, or dispensed in terms of countable, individual units or multiples, such as packages, cartons, crates, pallets, or other suitable aggregations. Alternatively, some items 904, such as bulk products, commodities, and so forth, may be stored in continuous or arbitrarily divisible amounts that may not be inherently organized into countable units. Such items 904 may be managed in terms of measurable quantity such as units of length, area, volume, weight, time, duration, or other dimensional properties characterized by units of measurement. Generally speaking, a quantity of an item 904 may refer to either a countable number of individual or aggregate units of an item 904 or a measurable amount of an item 904, as appropriate.

After arriving through the receiving area 906, items 904 may be stored within the storage area 908. In some examples, like items 904 may be stored or displayed together in the inventory locations 914 such as in bins, on shelves, hanging from pegboards, and so forth. In this example, all items 904 of a given kind are stored in one inventory location 914. In other examples, like items 904 may be stored in different inventory locations 914. For example, to optimize retrieval of certain items 904 having frequent turnover within a large physical facility 902, those items 904 may be stored in several different inventory locations 914 to reduce congestion that might occur at a single inventory location 914. Storage of the items 904 and their respective inventory locations 914 may comprise one or more events 924.

When a customer order specifying one or more items 904 is received, or as a user 916 progresses through the facility 902, the corresponding items 904 may be selected or "picked" from the inventory locations 914 containing those items 904. In various examples, item picking may range from manual to completely automated picking. For example, in one example, a user 916 may have a list of items 904 they desire and may progress through the facility 902 picking items 904 from inventory locations 914 within the storage area 908, and placing those items 904 into a tote 918. In other examples, employees of the facility 902 may pick items 904 using written or electronic pick lists derived from customer orders. These picked items 904 may be placed into the tote 918 as the employee progresses through the facility 902. Picking may comprise one or more events 924, such as the user 916 in moving to the inventory location 914, retrieval of the item 904 from the inventory location 914, and so forth.

After items 904 have been picked, they may be processed at a transition area 910. The transition area 910 may be any designated area within the facility 902 where items 904 are transitioned from one location to another or from one entity to another. For example, the transition area 910 may be a packing station within the facility 902. When the item 904 arrives at the transition area 910, the items 904 may be transitioned from the storage area 908 to the packing station. The transitioning may comprise one or more events 924. Information about the transition may be maintained by the inventory management system 922 using the output data 926 associated with those events 924.

In another example, if the items 904 are departing the facility 902 a list of the items 904 may be obtained and used by the inventory management system 922 to transition responsibility for, or custody of, the items 904 from the facility 902 to another entity. For example, a carrier may accept the items 904 for transport with that carrier accepting responsibility for the items 904 indicated in the list. In another example, a customer may purchase or rent the items 904 and remove the items 904 from the facility 902. The purchase or rental may comprise one or more events 924.

The inventory management system 922 may access or generate sensor data about the facility 902 and the contents therein including the items 904, the users 916, the totes 918, and so forth. The sensor data may be acquired by one or more of the sensors 920, data provided by other system(s), and so forth. For example, the sensors 920 may include sensors 920(1) configured to acquire image data of scenes in the facility 902. The image data may comprise still images, video, or a combination thereof. The image data may be processed by the inventory management system 922 to determine a location of the user 916, the tote 918, the identifier of the user 916, and so forth. As used herein, the identity of the user may represent a unique identifier of the user, an identifier that distinguishes the user amongst other users being located within the environment, or the like.

The inventory management system 922, or system(s) coupled thereto, may be configured to associate an account with the user 916, as well as to determine other candidate users. An account of the user 916 may be determined before, during, or after entry to the facility 902.

In some instances, the inventory management system 922 groups users within the facility into respective sessions. That is, the inventory management system 922 may utilize the sensor data to determine groups of users that are effectively "together" (e.g., shopping together). In some instances, a particular session may include multiple users that entered the facility 902 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 918. Noting the child and the mother as belonging to the same session may increase the chances of successfully adding the box of cereal to the virtual shopping cart of the mother.

By determining the occurrence of one or more events 924 and the output data 926 associated therewith, the inventory management system 922 is able to provide one or more services to the users 916 of the facility 902. By utilizing one or more facility associates to process inquiry data and generate response data that may then be used to produce output data 926, overall accuracy of the system may be enhanced. The enhanced accuracy may improve the user experience of the one or more users 916 of the facility 902. In some examples, the output data 926 may be transmitted over a network 930 to one or more servers 932 (e.g., remote system(s)).

FIG. 10 illustrates a block diagram of the server(s) 932. The server(s) 932 may be physically present at the facility 902, may be accessible by the network 930, or a combination of both. The server(s) 932 do not require end-user knowledge of the physical location and configuration of the system that delivers the services. Common expressions associated with the server(s) 932 may include "on-demand computing," "software as a service (SaaS)," "cloud services," "data centers," "remote system(s)", and so forth. Services provided by the server(s) 932 may be distributed across one or more physical or virtual devices.

The server(s) 932 may include one or more hardware processors 1002 (processors) configured to execute one or more stored instructions. The processor(s) 1002 may comprise one or more cores. The server(s) 932 may include one or more input/output (I/O) interfaces 1004 to allow the processor 1002 or other portions of the server(s) 932 to communicate with other devices. The I/O interface(s) 1004 may comprise Inter-Integrated Circuit (I2C), Serial Peripheral Interface bus (SPI), Universal Serial Bus (USB) as promulgated by the USB Implementers Forum, and so forth.

The server(s) 932 may also include one or more communication interfaces 1008. The communication interface(s) 1008 are configured to provide communications between the server(s) 932 and other devices, such as the sensors 920, the interface devices, routers, the server(s) 932, and so forth. The communication interface(s) 1008 may include devices configured to couple to personal area networks (PANs), wired and wireless local area networks (LANs), wired and wireless wide area networks (WANs), and so forth. For example, the communication interface(s) 1008 may include devices compatible with Ethernet, Wi-Fi™, and so forth. The server(s) 932 may also include one or more busses or other internal communications hardware or software that allow for the transfer of data between the various modules and components of the servers 932.

The server(s) 932 may also include a power supply 1040. The power supply 1040 is configured to provide electrical power suitable for operating the components in the server(s) 932.

The server(s) 932 may further include one or more memories 1010. The memory 1010 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1010 provides storage of computer-readable instructions, data structures, program modules, and other data for the operation of the servers 932. A few example functional modules are shown stored in the memory 1010, although the same functionality may alternatively be implemented in hardware, firmware, or as a system on a chip (SOC).

The memory 1010 may include at least one operating system (OS) component 1012. The OS component 1012 is configured to manage hardware resource devices such as the I/O interface(s) 1004, the communication interface(s) 1008, and provide various services to applications or components executing on the processor(s) 1002. The OS component 1012 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1010. These components may be executed as foreground applications, background tasks, daemons, and so forth. A communication component(s) 1014 may be configured to establish communications with one or more of the sensors 920, one or more of the devices used by associates, other server(s) 932, or other devices. The communications may be authenticated, encrypted, and so forth.

The memory 1010 may store an inventory management system 1016. The inventory management system 1016 is configured to provide the inventory functions as described herein with regard to the inventory management system 922. For example, the inventory management system 1016 may track movement of items 904 in the facility 902, generate user interface data, and so forth.

The inventory management system 1016 may access information stored in one or more data stores 1018 in the memory 1010. The data store(s) 1018 may use a flat file, database, linked list, tree, executable code, script, or other data structure to store the information. In some examples, the data store(s) 1018 or a portion of the data store(s) 1018 may be distributed across one or more other devices including other servers 932, network attached storage devices, and so forth.

The data store(s) 1018 may include physical layout data 1020. The physical layout data 1020 provides a mapping of physical locations within the physical layout of devices and objects such as the sensors 920, inventory locations 914, and so forth. The physical layout data 1020 may indicate the coordinates within the facility 902 of an inventory location 914, sensors 920 within view of that inventory location 914, and so forth. For example, the physical layout data 1020 may include camera data comprising one or more of a location within the facility 902 of a sensor 920(1), orientation of the sensor 920(1), the operational status, and so forth. Continuing example, the physical layout data 1020 may indicate the coordinates of the sensor 920(1), pan and tilt information indicative of a direction that the field of view 928 is oriented along, whether the sensor 920(1) is operating or malfunctioning, and so forth.

In some examples, the inventory management system 1016 may access the physical layout data 1020 to determine if a location associated with the event 924 is within the field of view 928 of one or more sensors 920. Continuing the example above, given the location within the facility 902 of the event 924 and the camera data, the inventory management system 1016 may determine the sensors 920(1) that may have generated images of the event 924.

The item data 1022 comprises information associated with the items 904. The information may include information indicative of one or more inventory locations 914 at which one or more of the items 904 are stored. The item data 1022 may also include order data, SKU or other product identifier, price, quantity on hand, weight, expiration date, images of the item 904, detail description information, ratings, ranking, and so forth. The inventory management system 1016 may store information associated with inventory management functions in the item data 1022.

The data store(s) 1018 may also include sensor data 1024. The sensor data 1024 comprises information acquired from, or based on, the one or more sensors 920. For example, the sensor data 1024 may comprise 3D information about an object in the facility 902. As described above, the sensors 920 may include a sensor 920(1), which is configured to acquire one or more images. These images may be stored as the image data 1026. The image data 1026 may comprise information descriptive of a plurality of picture elements or pixels. Non-image data 1028 may comprise information from other sensors 920, such as input from microphones, weight sensors, and so forth.

User data 1030 may also be stored in the data store(s) 1018. The user data 1030 may include identity data, information indicative of a profile, purchase history, location data, and so forth. Individual users 916 or groups of users 916 may selectively provide user data 1030 for use by the server(s) 932. The individual users 916 or groups of users 916 may also authorize collection of the user data 1030 during use of the facility 902 or access to user data 1030 obtained from other system(s). For example, the user 916 may opt-in to collection of the user data 1030 to receive enhanced services while using the facility 902.

In some examples, the user data 1030 may include information designating a user 916 for special handling. For example, the user data 1030 may indicate that a particular user 916 has been associated with an increased number of errors with respect to output data 936. The inventory management system 1016 may be configured to use this information to apply additional scrutiny to the events 934 associated with this user 916. For example, events 934 that include an item 904 having a cost or result above the threshold amount may be provided to a facility associate for processing regardless of the determined level of confidence in the output data 936 as generated by the automated system.

The inventory management system 1016 may include one or more of a location component 1032, identification component 1034, event-determination component 1036, and inquiry component 1038.

The location component 1032 functions to locate items or users within the environment of the facility to allow the inventory management system 1016 to assign certain events to the correct users. That is, the location component 1032 may assign unique identifiers to users as they enter the facility and, with the users' consent, may locate the users throughout the facility 902 over the time they remain in the facility 902. The location component 1032 may perform this locating using sensor data 1024, such as the image data 1026. For example, the location component 1032 may receive the image data 1026 and may use techniques to identify users from the images. After identifying a particular user within the facility, the location component 1032 may then locate the user within the images as the user moves throughout the facility 902. Further, should the location component 1032 temporarily "lose" a particular user, the location component 1032 may again attempt to identify the users within the facility based on techniques.

Therefore, upon receiving the indication of the time and location of the event in question, the location component 1032 may query the data store 1018 to determine which one or more users were at or within a threshold distance of the location of the event at the particular time of the event. Further, the location component 1032 may assign different confidence levels to different users, with the confidence levels indicating how likely it is that each corresponding user is the user that is in fact associated with the event of interest.

The location component 1032 may access the sensor data 1024 in order to determine this location data of the user and/or items. The location data provides information indicative of a location of an object, such as the item 904, the user 916, the tote 918, and so forth. The location may be absolute with respect to the facility 902 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 902, 5.2 m from an inventory location 914 along a heading of 213°, and so forth. For example, the location data may indicate that the user 916(1) is 25.2 m along the aisle 913(1) and standing in front of the inventory location 914. In comparison, a relative location may indicate that the user 916(1) is 32 cm from the tote 918 at a heading of 73° with respect to the tote 918. The location data may include orientation information, such as which direction the user 916 is facing. The orientation may be determined by the relative direction the user 916 is facing. In some examples, the orientation may be relative to the interface device. Continuing the example, the location data may indicate that the user 916(1) is oriented with a heading of 0°, or looking north. In another example, the location data may indicate that the user 916 is facing towards the interface device.

The identification component 1034 is configured to identify an object. In one example, the identification component 1034 may be configured to identify an item 904. In another example, the identification component 1034 may be configured to identify the user 916. For example, the identification component 1034 may use facial recognition techniques to process the image data 1026 and determine the user 916 depicted in the images by comparing the characteristics in the image data 1026 with previously stored results. The identification component 1034 may also access data from other sensors 920, such as from an RFID reader, an RF receiver, and so forth.

The event-determination component 1036 is configured to process the sensor data 1024 and generate output data 936, and may include components described above. The event-determination component 1036 may access information stored in the data store(s) 1018 including, but not limited to, event-description data 1042, confidence levels 1044, or threshold values 1046. In some instances, the event-determination component 1036 may be configured to perform some or all of the techniques described above with regards to the event-determination component 1036. For instance, the event-determination component 1036 may be configured to create and utilize event classifiers for identifying events (e.g., predefined activity) within image data, potentially without use of other sensor data acquired by other sensors in the environment.

The event-description data 1042 comprises information indicative of one or more events 934. For example, the event-description data 1042 may comprise predefined profiles that designate movement of an item 904 from an inventory location 914 with the event 934 of "pick". The event-description data 1042 may be manually generated or automatically generated. The event-description data 1042 may include data indicative of triggers associated with events occurring in the facility 902. An event may be determined as occurring upon detection of the trigger. For example, sensor data 1024 such as a change in weight from a weight sensor at an inventory location 914 may trigger detection of an event of an item 904 being added or removed from the inventory location 914. In another example, the trigger may comprise an image of the user 916 reaching a hand toward the inventory location 914. In yet another example, the trigger may comprise two or more users 916 approaching to within a threshold distance of one another.

The event-determination component 1036 may process the sensor data 1024 using one or more techniques including, but not limited to, artificial neural networks, classifiers, decision trees, support vector machines, Bayesian networks, and so forth. For example, the event-determination component 1036 may use a decision tree to determine occurrence of the "pick" event 934 based on sensor data 1024. The event-determination component 1036 may further use the sensor data 1024 to determine one or more tentative results 1048. The one or more tentative results 1048 comprise data associated with the event 934. For example, where the event 934 comprises a disambiguation of users 916, the tentative results 1048 may comprise a list of possible user 916 identities. In another example, where the event 934 comprises a disambiguation between items, the tentative results 1048 may comprise a list of possible item identifiers. In some examples, the tentative result 1048 may indicate the possible action. For example, the action may comprise the user 916 picking, placing, moving an item 904, damaging an item 904, providing gestural input, and so forth.

In some examples, the tentative results 1048 may be generated by other components. For example, the tentative results 1048 such as one or more possible identities or locations of the user 916 involved in the event 934 may be generated by the location component 1032. In another example, the tentative results 1048 such as possible items 904 that may have been involved in the event 934 may be generated by the identification component 1034.

The event-determination component 1036 may be configured to provide a confidence level 1044 associated with the determination of the tentative results 1048. The confidence level 1044 provides indicia as to the expected level of accuracy of the tentative result 1048. For example, a low confidence level 1044 may indicate that the tentative result 1048 has a low probability of corresponding to the actual circumstances of the event 934. In comparison, a high confidence level 1044 may indicate that the tentative result 1048 has a high probability of corresponding to the actual circumstances of the event 934.

In some examples, the tentative results 1048 having confidence levels 1044 that exceed the threshold may be deemed to be sufficiently accurate and thus may be used as the output data 1056. For example, the event-determination component 1036 may provide tentative results 1048 indicative of the three possible items 904(1), 904(2), and 904(3) corresponding to the "pick" event 934. The confidence levels 1044 associated with the possible items 904(1), 904(2), and 904(3) may be 25%, 70%, 99%, respectively. Continuing the example, the threshold value 1046 may be set such that confidence level 1044 of 99% are deemed to be sufficiently accurate. As a result, the event-determination component 1036 may designate the "pick" event 934 as involving item 904(3).

The inquiry component 1038 may be configured to use at least a portion of the sensor data 1024 associated with the event 934 to generate inquiry data 1050. In some examples, the inquiry data 1050 may include one or more of the tentative results 1048 or supplemental data 1052. The inquiry component 1038 may be configured to provide inquiry data 1050 to one or more devices associated with one or more human associates.

An associate user interface is presented on the respective devices of associates. The associate may generate response data 1054 by selecting a particular tentative result 1048, entering new information, indicating that they are unable to answer the inquiry, and so forth.

The supplemental data 1052 comprises information associated with the event 934 or that may be useful in interpreting the sensor data 1024. For example, the supplemental data 1052 may comprise previously stored images of the items 904. In another example, the supplemental data 1052 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1026 during presentation to an associate.

The inquiry component 1038 processes the response data 1054 provided by the one or more associates. The processing may include calculating one or more statistical results associated with the response data 1054. For example, statistical results may include a count of the number of times associates selected a particular tentative result 1048, determination of a percentage of the associates that selected a particular tentative result 1048, and so forth.

The inquiry component 1038 is configured to generate the output data 1056 based at least in part on the response data 1054. For example, given that a majority of the associates returned response data 1054 indicating that the item 904 associated with the "pick" event 934 is item 904(5), the output data 936 may indicate that the item 904(5) was picked.

The inquiry component 1038 may be configured to selectively distribute inquiries to particular associates. For example, some associates may be better suited to answering particular types of inquiries. Performance data, such as statistical data about the performance of the associates, may be determined by the inquiry component 1038 from the response data 1054 provided by the associates. For example, information indicative of a percentage of different inquiries in which the particular associate selected response data 1054 that disagreed with the majority of associates may be maintained. In some examples, test or practice inquiry data 1050 having a previously known correct answer may be provided to the associate for training or quality assurance purposes. The determination of the set of associates to use may be based at least in part on the performance data.

By using the inquiry component 1038, the event-determination component 1036 may be able to provide high reliability output data 1056 that accurately represents the event 934. The output data 1056 generated by the inquiry component 1038 from the response data 1054 may also be used to further train the automated system(s) used by the inventory management system 1016. For example, the sensor data 1024 and the output data 1056, based on response data 1054, may be provided to one or more of the components of the inventory management system 1016 for training in process improvement. Continuing the example, this information may be provided to an artificial neural network, Bayesian network, and so forth, to further train these system(s) such that the confidence level 1044 and the tentative results 1048 produced in the future for the same or similar input is improved. Finally, as FIG. 10 illustrates, the server(s) 932 may store and/or utilize other data 1058.

As further illustrated in the example of FIG. 10, the server(s) 932 may include a fleet management component 1060 that may correspond to the fleet management system 322 described herein. The server(s) 932 may also include an image registration component 1064, status component 1068, and other component(s) 1072 to perform one or more additional tasks or actions as described herein.

In some examples, the system(s) described herein may represent, and/or include, at least a portion of the server(s) 932. For example, the system(s) may include all of the components of the server(s) 932. For another examples, the system(s) may only include a portion of the components of the server(s). For instance, the system(s) may include at least the fleet management component 1060, the image registration component 1064, and the status component 1068. In such examples, the server(s) 932 may be split into more than one server 932, where each server 932 includes at least a portion of the components and where the servers 932 are able communicate with one another in order to share data.

Additionally, while the example of FIG. 10 illustrates the server(s) 932 as including the location component 1032, the identification component 1034, the event-determination component 1036, the inquiry component 1038, the fleet management component 1060, the image registration component 1064, and the status component 1068, in other examples, the server(s) 932 may include one or more other components 1072.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer system(s). Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
one or more processors; and
one or more computer-readable media storing instructions that, when executed by the one or more processors, cause the system to perform operations comprising:
determining a time interval since a first inventory update within a facility;
determining, in response to the time interval being greater than a threshold, an inventory location to image;
determining an imaging region within the facility based at least in part on the inventory location and imaging capabilities of a shopping cart equipped with an imaging device;
conveying instructions to a fleet of shopping carts equipped with imaging devices, the instructions configured to cause a shopping cart of the fleet to capture image data of the inventory location when the shopping cart is positioned within the imaging region;
receiving image data from the shopping cart;
determining an item stock status based on the image data;
determining a second inventory update based on the item stock status; and
based at least in part on the second inventory update, updating item stock data describing a presence of an item at the inventory location within the facility.

2. The system as recited in claim 1, wherein the instructions comprise trigger criteria describing conditions of the shopping cart, the trigger criteria configured to causing the shopping cart to capture image data in response to the trigger criteria being satisfied.

3. The system as recited in claim 1, wherein receiving image data from the shopping cart comprises:
determining a freshness score for image data of the inventory location stored on one or more of a plurality of shopping carts; and
selecting the image data from the shopping cart based on the freshness score.

4. A method comprising:
determining a time interval since a first status update for a facility location at a first time within a facility;
determining, in response to the time interval being greater than a threshold, an imaging region within the facility based at least in part on the facility location and imaging capabilities of movable totes configured to be navigated by a user and equipped with one or more imaging devices;
conveying instructions to a fleet of the movable totes, the instructions configured to cause a movable tote of the fleet to capture image data of the facility location at a second time later than the first time in response to the movable tote being positioned within the imaging region;
receiving the image data from the movable tote;
determining a second status update based on the image data; and
based at least in part on the second status update, storing status data representing at least a status of the facility location at the second time.

5. The method as recited in claim 4, wherein the instructions comprise trigger criteria describing conditions of the movable tote, the trigger criteria configured to causing the movable tote to capture image data in response to the trigger criteria being satisfied.

6. The method as recited in claim 5, wherein the trigger criteria comprise motion data describing motion of the movable tote and occlusion data describing an occlusion state of the imaging device.

7. The method as recited in claim 4, wherein:
the first status update comprises a first inventory update describing a first quantity or first status of an item at an inventory location at the first time within the facility;
the facility location is associated with the inventory location; and
the second status update comprises a second inventory update describing a second quantity or second status of the item at the second time.

8. The method as recited in claim 4, wherein receiving image data from the movable tote comprises:
determining a freshness score for image data of the facility location stored on one or more of a plurality of movable totes; and
selecting the image data from the movable tote based on the freshness score.

9. The method as recited in claim 4, wherein determining the imaging region based on imaging capabilities comprises at least one of:
determining a distance and angle from the imaging region to the facility location;
determining that the distance is within a focal distance of the imaging devices; or
determining that the angle is within a field of view of the imaging devices.

10. The method as recited in claim 4, wherein the instructions further cause a display associated with the movable tote to output a representation of the imaging region as part of a gaming interface.

11. The method as recited in claim 4, wherein:
the first status update comprises a first organizational status of the facility location at the first time; and
the second status update comprises a second organizational status of the facility location at the second time.

12. The method as recited in claim 11, wherein the first organizational status and the second organizational status describe a cleanliness of at least a portion of the facility.

13. The method as recited in claim 4, wherein:
the first status update comprises first user gaze information describing gaze patterns of users with respect to an item within the facility; and
the second status update comprises second user gaze information gaze at the second time.

14. The method as recited in claim 13, wherein the first user gaze information and the second user gaze information are used to determine a heatmap of user gaze information within the facility.

15. A system comprising:
one or more processors; and
one or more computer-readable media storing instructions that, when executed by the one or more processors, cause the one or more processors to perform operations comprising:
determining a time interval since a first status update for a facility location at a first time within a facility;
determining, in response to the time interval being greater than a threshold, an imaging region within the facility based at least in part on the facility location and imaging capabilities of movable totes configured to be navigated by a user and equipped with one or more imaging devices;
conveying instructions to a fleet of the movable totes, the instructions configured to cause a movable tote of the fleet to capture image data of the facility location at a second time later than the first time in response to the movable tote being positioned within the imaging region;
receiving the image data from the movable tote;
determining a second status update based on the image data; and
based at least in part on the second status update, storing status data representing at least a status of the facility location at the second time.

16. The system as recited in claim 15, wherein the instructions comprise trigger criteria describing conditions of the movable tote, the trigger criteria configured to cause the movable tote to capture image data in response to the trigger criteria being satisfied.

17. The system as recited in claim 16, wherein the trigger criteria comprise motion data describing motion of the movable tote and occlusion data describing an occlusion state of the imaging device.

18. The system as recited in claim 15, wherein:
the first status update comprises a first inventory update describing a first quantity or first status of an item at an inventory location at the first time within the facility;
the facility location is associated with the inventory location; and
the second status update comprises a second inventory update describing a second quantity or second status of the item at the second time.

19. The system as recited in claim 15, wherein:
the first status update comprises a first organizational status of the facility location at the first time; and
the second status update comprises a second organizational status of the facility location at the second time.

20. The system as recited in claim 15, wherein:
the first status update comprises first user gaze information describing gaze patterns of users with respect to an item within the facility; and
the second status update comprises second user gaze information gaze at the second time.

* * * * *